United States Patent (10) Patent No.: US 9,350,282 B2
Kato (45) Date of Patent: May 24, 2016

(54) MOTOR CONTROL DEVICE AND MOTOR CONTROL METHOD

(71) Applicant: MITSUBISHI HEAVY INDUSTRIES, LTD., Tokyo (JP)

(72) Inventor: Yoshiki Kato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/351,261

(22) PCT Filed: Oct. 4, 2012

(86) PCT No.: PCT/JP2012/075815
§ 371 (c)(1),
(2) Date: Apr. 11, 2014

(87) PCT Pub. No.: WO2013/058122
PCT Pub. Date: Apr. 25, 2013

(65) Prior Publication Data
US 2014/0285125 A1 Sep. 25, 2014

(30) Foreign Application Priority Data

Oct. 21, 2011 (JP) .................................. 2011-231883

(51) Int. Cl.
*H03K 5/00* (2006.01)
*H02P 21/00* (2016.01)
(Continued)

(52) U.S. Cl.
CPC .............. *H02P 21/0039* (2013.01); *H02P 6/06* (2013.01); *H02P 21/0035* (2013.01); *H02P 21/146* (2013.01)

(58) Field of Classification Search
CPC ................................ H02P 21/146; B60L 11/14
See application file for complete search history.

(56) References Cited

U.S. PATENT DOCUMENTS 7,659,688 B2 2/2010 Schulz et al.
2005/0104551 A1 5/2005 Nishimura et al.
(Continued)

FOREIGN PATENT DOCUMENTS

JP 06-165561 6/1994
JP 08-182399 7/1996
(Continued)

OTHER PUBLICATIONS

Written Opinion of the International Searching Authority issued Dec. 25, 2012 in International (PCT) Application No. PCT/JP2012/075815 with English translation.
(Continued)

*Primary Examiner* — Shawki S Ismail
*Assistant Examiner* — Zoheb Imtiaz
(74) *Attorney, Agent, or Firm* — Wenderoth, Lind & Ponack, L.L.P.

(57) ABSTRACT

This motor control device generates a voltage command value from a current command value, performs feedback control by means of a detected current flowing through a motor, and is provided with: a speed control unit that performs speed control of the motor; a voltage measurement unit that measures a voltage command value that is on the basis of the output of the speed control unit when the motor is rotating at a set speed; and a correction value calculation unit that calculates a correction value for the rotational position of the motor on the basis of the measured voltage command value.

6 Claims, 11 Drawing Sheets

(51) Int. Cl.
*H02P 21/14* (2016.01)
*H02P 6/06* (2006.01)

(56) References Cited

U.S. PATENT DOCUMENTS

| | | | |
|---|---|---|---|
| 2008/0272731 A1 | 11/2008 | Schulz et al. | |
| 2009/0187312 A1* | 7/2009 | Nozawa | B62D 5/046 701/42 |
| 2011/0031912 A1* | 2/2011 | Hong | H02P 6/10 318/400.04 |
| 2011/0210687 A1* | 9/2011 | Tsuji | H02P 21/0003 318/400.02 |
| 2012/0249025 A1* | 10/2012 | Okita | H02P 21/0032 318/400.02 |

FOREIGN PATENT DOCUMENTS

| | | |
|---|---|---|
| JP | 09-047066 | 2/1997 |
| JP | 09-056199 | 2/1997 |
| JP | 10-262398 | 9/1998 |
| JP | 11-168895 | 6/1999 |
| JP | 2000-166300 | 6/2000 |
| JP | 2001-008486 | 1/2001 |
| JP | 2001-128484 | 5/2001 |
| JP | 2001-197767 | 7/2001 |
| JP | 2001-309694 | 11/2001 |
| JP | 2002-136168 | 5/2002 |
| JP | 2002-238278 | 8/2002 |
| JP | 2002-374692 | 12/2002 |
| JP | 2003-079185 | 3/2003 |
| JP | 2004-129359 | 4/2004 |
| JP | 2004-266935 | 9/2004 |
| JP | 2004-289959 | 10/2004 |
| JP | 2005-218257 | 8/2005 |
| JP | 2006-033993 | 2/2006 |
| JP | 3789895 | 6/2006 |
| JP | 2009-100615 | 5/2009 |
| JP | 2010-119245 | 5/2010 |
| JP | 2010-148271 | 7/2010 |
| JP | 2010-154588 | 7/2010 |

OTHER PUBLICATIONS

International Search Report issued Dec. 25, 2012 in International (PCT) Application No. PCT/JP2012/075815 with English translation.

Extended European Search Report issued Mar. 4, 2016 in corresponding Application No. 12841925.6.

\* cited by examiner

FIG. 10A

| NUMBER OF ROTATIONS [rpm] | OFFSET ERROR $\Delta\theta$ [deg] | $Vd_c$ | $Vq_c$ |
|---|---|---|---|
| 1000 | 1.7 | −5.0 | 105.2 |
| −1000 | 1.7 | −11.9 | −105.1 |

FIG. 10B

| | CALCULATED VALUE [deg] |
|---|---|
| OFFSET ERROR CORRECTION VALUE $\Delta\theta'$ (ONLY POSITIVE ROTATION) | −2.7 |
| OFFSET ERROR CORRECTION VALUE $\Delta\theta'$ (ONLY NEGATIVE ROTATION) | 6.5 |
| OFFSET ERROR CORRECTION VALUE $\Delta\theta'$ | 1.9 |

FIG. 10C

| NUMBER OF ROTATIONS [rpm] | OFFSET ERROR $\Delta\theta$ [deg] | $Vd_c$ | $Vq_c$ |
|---|---|---|---|
| 1000 | 31.7 | 44.8 | 87.1 |
| −1000 | 31.7 | −64.5 | −86.8 |

FIG. 10D

| | CALCULATED VALUE [deg] |
|---|---|
| OFFSET ERROR CORRECTION VALUE $\Delta\theta'$ (ONLY POSITIVE ROTATION) | 27.2 |
| OFFSET ERROR CORRECTION VALUE $\Delta\theta'$ (ONLY NEGATIVE ROTATION) | 36.6 |
| OFFSET ERROR CORRECTION VALUE $\Delta\theta'$ | 31.9 |

MOTOR CONTROL DEVICE AND MOTOR CONTROL METHOD

TECHNICAL FIELD

The present invention relates to a motor control device and a motor control method.

Priority is claimed on Japanese Patent Application No. 2011-231883, filed Oct. 21, 2011, the content of which is incorporated herein by reference.

BACKGROUND ART

When a 3-phase brushless motor is controlled, the 3-phase brushless motor is not controlled on 3 phases of U, V, and W, but is generally controlled on 2 phases of d and q axes by performing coordinate conversion of the 3 phases of U, V, and W into biaxial coordinates of d and q axes.

Here, an overview of dq vector control by which the coordinate conversion into biaxial coordinates of the d and q axes is performed will be described. In the dq vector control, a motor control process is performed by an equivalent circuit on a dq coordinate system in which a field direction of a rotor is the d axis and the direction orthogonal to the field direction is the q axis. A motor control device controlling such a motor controls a d-axis command voltage Vd* and a q-axis command voltage Vq* through feedback control such that a detection current Id of the d axis and a detection current Iq of the q axis follow a d-axis command current Id* and a q-axis command current Iq* using, for example, proportional integral (PI) control.

As an angle detector detecting a rotation angle position of a rotor included in such a motor, an angle detector detecting a rotation angle by combining a resolver and an angle detection circuit is used. The resolver is a rotation detection device that detects a rotation angle of a rotor by a phase difference between a rotor coil and a stator coil. The resolver produces a magnetic field by applying a sinusoidal signal (E sin(ωt)) (where E is an amplitude of a sinusoidal wave and ω is an excitation frequency)) to the rotor coil. In the magnetic field, a voltage (KE sin(ωt)×sin(θ), KE sin(ωt)×cos(θ)) having a phase difference between two stator coils orthogonal to each other is produced in the two stator coils. The resolver detects a rotation angle θ using outputs of the stator coils. Then, the motor control device controls a current of the motor based on the detected rotation angle θ.

However, in the motor in which such an angle detector is assembled, for example, an error due to manufacturing precision of a resolver between rotation positions of the angle detector and a synchronous motor or an error due to the assembly of the resolver may be caused.

For this reason, the motor control device disclosed in Patent Literature 1 rotates a motor from the outside by setting current command values of the d and q axes to 0. In this case, an induced voltage is generated in the motor, but the motor control device controls the motor such that the current becomes 0. Therefore, the motor control device controls the motor such that a d-axis current Id and a q-axis current Iq become 0. Therefore, when there is no deviation in a phase between the angle detector and the rotation position of the synchronous motor, only a q-axis voltage Vq is generated and a d-axis voltage Vd becomes 0.

However, when there is a deviation in the phase between the angle detector and the rotation position of the synchronous motor, the d-axis voltage Vd is generated. The motor control device disclosed in Patent Literature 1 obtains a d-axis command voltage Vd* and a q-axis command voltage Vq* so that the d-axis current Id and the q-axis current Iq become 0, and calculates an offset amount Δθ so that the obtained d-axis command voltage Vd* becomes 0. Further, the motor control device disclosed in Patent Literature 1 corrects the deviation occurring between the angle detector and the rotation position of the synchronous motor using the calculated offset amount.

Also, a motor control device disclosed in Patent Literature 2 rotates a motor by controlling a q-axis current Iq to 0 so that a d-axis current Id flows. In this case, the q-axis current Iq is a current by which torque is generated and the d-axis current Id is an excitation current. Therefore, in the case in which there is no deviation between an angle detector and the rotation position of a synchronous motor, no torque is generated even when the q-axis current Id is set to 0 and the d-axis current Id flows. However, in the case in which there is deviation between the angle detector and a rotation position of the synchronous motor, torque is generated when the q-axis current Iq is set to 0 and the d-axis current Id flows. For this reason, in the motor control device disclosed in Patent Literature 2, a deviation occurring due to an embedded-position aberration between the angle detector and a rotation position of the synchronous motor, a manufacture error, or the like is corrected by adjusting the torque so that the toque becomes 0 when the q-axis current Iq is controlled to 0 and the motor is rotated by flowing the d-axis current Id.

PRIOR ART LITERATURE

Patent Literature

[Patent Literature 1]
  Japanese Patent No. 3789895
[Patent Literature 2]
  Japanese Unexamined Patent Application, First Publication No. 2002-374692

SUMMARY OF INVENTION

In the technology disclosed in Patent Literature 1, however, the coordinate conversion into the biaxial coordinates of the d and q axes is performed using a converter that converts a detection signal from 2 phases to 3 phases. On the other hand, in the technology disclosed in Patent Literature 1, delay occurs even in a pulse width modulation (PWM) converter driving a motor based on a generated command value. For this reason, the delay occurs between outputs of the angle detector and the PWM converter in some cases. As a result, in the technology disclosed in Patent Literature 1, there is the problem that the motor may not be controlled with high precision since the delay value has an influence on precision of offset adjustment. Also, in the technology disclosed in Patent Literature 1, an offset adjustment amount is calculated from a command voltage value. However, since a command voltage is easily affected by noise or a high-frequency wave, there is the problem that the motor may not be controlled with high precision.

Also, in the technology disclosed in Patent Literature 2, correction is performed using torque. Therefore, when there is friction in the motor and a load connected to the motor, the friction has an influence on the torque and an error occurs in a corrected value, and thus there is the problem that the motor may not be controlled with high precision.

The present invention is devised in view of the above-mentioned problems and an object of the present invention is to provide a motor control device and a motor control method capable of controlling a motor with high precision.

In order to achieve the foregoing object, according to an aspect of the present invention, there is provided a motor control device generating a voltage command value from a current command value and performing feedback control using a detection current flowing in a motor. The motor control device includes: a velocity control unit configured to perform velocity control of the motor; a voltage measurement unit configured to measure the voltage command value based on an output of the velocity control unit when the motor is rotated at a constant velocity; and a correction value calculation unit configured to calculate a correction value at a rotation position of the motor based on the measured voltage command value.

According to the aspect of the present invention, the correction value calculation unit may generate a value indicating the rotation position by adding the calculated correction value and a detection value corresponding to the rotation position of the motor. The velocity control unit may control the motor based on the generated value indicating the rotation position.

According to the aspect of the present invention, the voltage command value may include a d-axis voltage command value and a q-axis voltage command value. The voltage measurement unit may measure the d-axis current command value and the q-axis current command value when the motor is rotated based on the velocity command value. The correction value calculation unit may calculate a first correction value as the correction value based on phases of the measured d-axis voltage command value and the measured q-axis voltage command value when the motor is positively rotated.

According to the aspect of the present invention, the correction value calculation unit may calculate, as the correction value, a second correction value calculated based on phases of the measured d-axis voltage command value and the measured q-axis voltage command value when the motor is negatively rotated.

According to the aspect of the present invention, the velocity control unit may perform the velocity control such that an absolute value of a rotation velocity of the motor in the positive rotation of the motor is the same as an absolute value of rotation velocity of the motor in the negative rotation of the motor. The correction value calculation unit may calculate the correction value by calculating an average of the calculated first and second correction values.

According to the aspect of the present invention, the correction value calculation unit may calculate the correction value, the first correction value, and the second correction value using an equation below.

$$\text{CORRECTION VALUE} = \tan^{-1}\left(\frac{d\text{- AXIS VOLTAGE COMMAND VALUE}}{q\text{- AXIS VOLTAGE COMMAND VALUE}}\right) \quad [\text{Math. 1}]$$

According to the aspect of the present invention, the velocity control unit may include a current proportional integral control unit configured to include a non-interactive control unit generating the voltage command value from the current command value. The voltage measurement unit may measure a d-axis voltage command value Vd' generated based on an integral component of a d-axis current deflection generated in the current proportional integral control unit and a d-axis voltage component generated in the non-interactive control unit and a q-axis voltage command value Vq' generated based on an integral component of a q-axis current deflection generated in the current proportional integral control unit and a q-axis voltage component generated in the non-interactive control unit.

According to the aspect of the present invention, the voltage measurement unit may measure the d-axis voltage command value Vd' expressed in an equation below.

$$Vd'=(\text{INTEGRAL VALUE OF } d\text{-AXIS CURRENT DEFLECTION})+(\text{WIRING RESISTANCE VALUE } Ra)\times(d\text{-AXIS CURRENT COMMAND VALUE})-(\text{ANGULAR VELOCITY } \omega \text{ OF MOTOR})\times(\text{INDUCTANCE COMPONENT VALUE OF } q \text{ AXIS})\times(\text{CURRENT COMMAND VALUE OF } q \text{ AXIS}) \quad [\text{Math. 2}]$$

The voltage measurement unit may measure the q-axis voltage command value Vq' expressed in an equation below.

$$Vq'=(\text{INTEGRAL VALUE OF } q\text{-AXIS CURRENT DEFLECTION})+(\text{WIRING RESISTANCE VALUE } Ra)\times(q\text{-AXIS CURRENT COMMAND VALUE})+(\text{ANGULAR VELOCITY } \omega \text{ OF MOTOR})\times(\text{INDUCTANCE COMPONENT VALUE OF } d \text{ AXIS})\times(\text{CURRENT COMMAND VALUE OF } d \text{ AXIS})+(\text{ANGULAR VELOCITY } \omega \text{ OF MOTOR})\times(\text{LINKAGE MAGNETIC FLUX } \Phi a \text{ of MOTOR}) \quad [\text{Math. 3}]$$

In order to achieve the foregoing object, according to an aspect of the present invention, there is provided a motor control method of a motor control device generating a voltage command value from a current command value and performing feedback control using a detection current flowing in a motor. The motor control method includes: a velocity control procedure of performing, by a velocity control unit, velocity control of the motor; a voltage measurement procedure of measuring, by a voltage measurement unit, the voltage command value based on an output of the velocity control unit when the motor is rotated at a constant velocity; and a correction value calculation procedure of calculating, by a correction value calculation unit, a correction value at a rotation position of the motor based on the measured voltage command value.

According to the present invention, a voltage command value is measured when a motor is rotated at a constant velocity, a correction value at a rotation position of the motor is calculated based on the measured voltage command value, and the rotation of the motor is controlled using the calculated correction value. As a result, even when the detected rotation position is deviated, the motor can be controlled with high precision.

BRIEF DESCRIPTION OF THE DRAWINGS

FIG. 10A is a diagram for describing an example of a result obtained by calculating an offset error using an actual device according to the first embodiment.

FIG. 10B is a diagram for describing an example of a result obtained by calculating an offset error using an actual device according to the first embodiment.

FIG. 10C is a diagram for describing an example of a result obtained by calculating an offset error using an actual device according to the first embodiment.

FIG. 10D is a diagram for describing an example of a result obtained by calculating an offset error using an actual device according to the first embodiment.

DETAILED DESCRIPTION OF THE INVENTION

Figure 1:
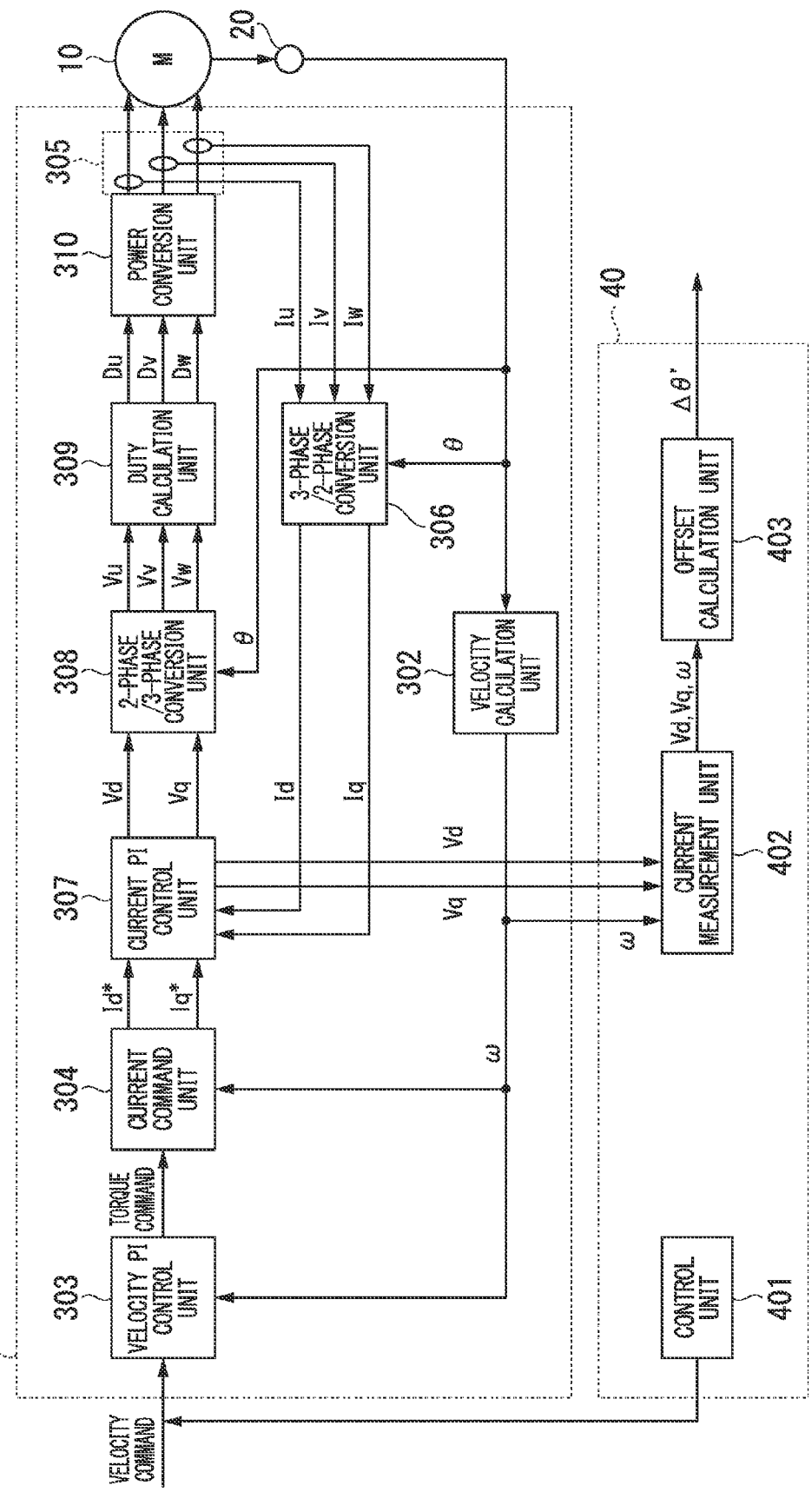
FIG. 1 is a control block diagram illustrating a motor control device according to a first embodiment.

Hereinafter, embodiments of the present invention will be described in detail with reference to the drawings. Also, the present invention is not limited to related embodiments, but may be modified in various forms within the scope of the technical spirit and essence.

First, an overall operation of a motor control device will be described.

The motor control device is a device that is supplied with power from a battery cell and controls a motor, for example, in an industrial vehicle, an electric vehicle, a hybrid vehicle, an electric train, a ship, an airplane, and a power generation system.

In an electric vehicle using an electric motor as motive power or a hybrid vehicle (hereinafter referred to as "an electric vehicle or the like") using an internal-combustion engine and an electric motor together as motive power, to improve power use efficiency, a motor control device uses pulse width modulation (PWM) control such that a pulse width is modulated when a 3-phase driving current is controlled.

In an electric vehicle or the like, a permanent magnet synchronous motor is mainly used and a 3-phase current synchronized with rotation flows in this motor. To perform PWM control on the 3-phase current, an electric pulse with a constant frequency which is called a carrier signal is used. In this case, a driving current is supplied with a rectangular wave with a modulated pulse width to the motor in accordance with a timing of the carrier signal and becomes a 3-phase current of a sinusoidal wave by an inductance of the motor.

In such a motor control device, a current flowing in the motor is controlled through proportional integral (PI) control using feedback so that the torque of an input torque command is obtained. Also, in the PI control, 3 phases of u, v, and w to be supplied to the motor are subjected to coordinate conversion to obtain biaxial coordinates of d and q axes and control is performed on 2 phases of the d and q axes. Also, in such a motor control device, a resolver which is an angle detection device detecting a rotation angle of the motor is assembled. Further, in the PI control of a current, the motor is controlled by generating a current command value based on a detected rotation angle of the motor and an input torque command and performing control such that the generated current command value matches a measured value of the current flowing in the motor.

The biaxial coordinates of the d and q axes (hereinafter referred to as a dq coordinate system) are a rotation coordinate system and are represented as a dq coordinate system that has a d axis in the direction of a magnetic flux produced by a permanent magnet forming a rotor and a q axis of which a phase is advanced 90 degrees from the d axis. Further, the dq coordinate system is rotated and a rotation velocity is an angular velocity $\omega$. In the dq coordinate system, a d-axis component and a q-axis component of a voltage V of the motor are represented by Vd and Vq, respectively. Also, in the dq coordinate system, a d-axis component and a q-axis component of a current I of the motor are represented by Id and Iq, respectively.

Next, an overview of the present invention will be described.

In a motor control system, an error due to assembling precision of a resolver, an error due to manufacturing of the resolver, an error due to processing delay of a detection signal by the resolver, or the like (hereinafter referred to as an error due to the resolver) occurs. To correct such an error, in the motor control system according to the present invention, a motor in an unloaded state is rotated at a constant velocity in a control region in which no d-axis current flows and a velocity of the motor is not within a field-weakening control region.

When the motor is constantly rotated in the unloaded state, a d-axis current and only a minute q-axis current flow in an actual operation. However, an error due to the resolver occurs, and thus angular deviation of the dq coordinate system occurs in coordinates in an actual operation and coordinates in the motor control device. Thus, when there is angular deviation of the dq coordinate system in the actual operation and the motor control device, the phase of an excitation voltage vector $\omega\Phi a$ appears to deviate and an angle of the voltage vector of the motor is affected in the motor control device.

Based on such a principle, in the motor control system according to the present invention, voltage command values of the d and q axes are measured when the motor in the unloaded state is rotated at a constant velocity. Further, in the motor control system according to the present invention, motor control is performed by calculating an offset error (correction value) from the measured voltage command values of the d and q axes and adding the calculated offset error correction value to a detection signal by the resolver.

First Embodiment

A motor control device according to a first embodiment rotates a motor in an unloaded state in a control region (for example, a voltage control region to be described below) in which no d-axis current is generated and a velocity of the motor is not within a field-weakening control region. When the motor is rotated in the unloaded state at the constant velocity in this way, the motor control device according to the present embodiment measures a d-axis voltage command value and a q-axis voltage command value and calculates an offset error correction value. Hereinafter, the first embodiment will be described in detail.

FIG. 1 is a control block diagram illustrating the motor control device according to the present embodiment.

As illustrated in FIG. 1, a motor control system 1 according to the present embodiment includes a resolver 20, a motor control device 30, and an offset correction device 40.

The motor control device 30 includes a velocity calculation unit (velocity control unit) 302, a velocity PI control unit (velocity control unit) 303, a current command unit (velocity control unit) 304, a current detector 305, a 3-phase/2-phase conversion unit 306, a current PI control unit (a velocity control unit or a current proportional integral control unit) 307, a 2-phase/3-phase conversion unit 308, a duty calculation unit 309, and a power conversion unit 310.

The offset correction device 40 includes a control unit 401, a voltage measurement unit (voltage measurement unit) 402, and an offset calculation unit (correction value calculation unit) 403.

Also, the motor control device 30 is connected to the motor 10 and the offset correction device 40.

The motor 10 is a 3-phase motor and is driven by a driving current output from the power conversion unit 310. The resolver 20 is assembled in the motor 10.

The resolver 20 is assembled in the motor 10. The resolver 20 detects a rotation angle of the motor 10 at each instant at each sampling time (hereinafter, a detected rotation angle is referred to as a detection angle) and outputs the detected detection angle to the velocity calculation unit 302, the 3-phase/2-phase conversion unit 306, and the 2-phase/3-phase conversion unit 308. Also, a sampling frequency is, for example, 5 [kHz].

The velocity calculation unit 302 calculates an angular velocity $\omega$ of the rotor of the motor 10 from a detection angle $\theta$ detected by the resolver 20 and outputs the calculated angular velocity $\omega$ to the velocity PI control unit 303, the current command unit 304, and the offset correction device 40.

The velocity proportional integral (PI) control unit 303 controls a rotation velocity of the motor 10 such that the rotation velocity of the motor 10 becomes a velocity command value input from the outside. The velocity PI control unit 303 calculates a torque command value $\tau^*$ by which the rotation velocity of the motor 10 becomes the velocity command value $\omega^*$ based on a deflection between the velocity command $\omega^*$ input from the outside and the angular velocity $\omega$ output by the velocity calculation unit 302, and outputs the calculated torque command value $\tau^*$ to the current command unit 304. The torque command value $\tau^*$ is used to command torque generated in the motor 10. Also, in the present specification, a command value or a command signal is represented by a variable to which "*" is attached to on its upper right.

Also, the velocity PI control unit 303 calculates the torque command value $\tau^*$ with regard to the motor 10 based on a current command value $\omega^*$ output by the control unit 401 of the offset correction device 40 and outputs the calculated torque command value $\tau^*$ to the current command unit 304.

The angular velocity $\omega$ output from the velocity calculation unit 302 and the torque command value $\tau^*$ output by the velocity PI control unit 303 are input to the current command unit 304. The current command unit 304 generates a current command value Id* of the d axis and a current command value Iq* of the q axis (hereinafter referred to as a d-axis current command value and a q-axis current command value) which are 2-phase command currents having the d-axis component and the q-axis component, from the torque command value $\tau^*$ and the angular velocity $\omega$. The current command unit 304 outputs the generated d-axis current command value Id* and q-axis current command value Iq* to the current PI control unit 307.

The current detector 305 detects 3-phase currents Iu, Iv, and Iw with regard to the motor 10 and outputs the detected currents Iu, Iv, and Iw of 3 phases to the 3-phase/2-phase conversion unit 306.

The 3-phase/2-phase conversion unit 306 converts the currents Iu, Iv, and Iw of the 3 phases output by the current detector 305 into a d-axis component Id and a q-axis component Iq (hereinafter referred to as detection currents) of 2 phases. The 3-phase/2-phase conversion unit 306 outputs the converted detection currents Id and Iq to the current PI control unit 307. Also, a current (d-axis current) of the d-axis component refers to a component (excitation current component) used to generate a magnetic flux in the motor 10 in a flowing current when the d axis is in the direction of the magnetic flux. Also, a current (q-axis current) of the q-axis component refers to a component corresponding to torque of a load among the flowing currents.

The d-axis current command value Id* and the q-axis current command value Iq* output by the current command unit 304 and the detection currents Id and Iq output by the 3-phase/2-phase conversion unit 306 are input to the current PI control unit 307. The current PI control unit 307 controls the current Iu, Iv, and Iw flowing in the motor 10 such that the detection currents Id and Iq which are control variables become values according to the d-axis current command value Id* and the q-axis current command value Iq*.

The current PI control unit 307 calculates deflections $\Delta$Id and $\Delta$Iq by subtracting the detection currents Id and Iq from the input d-axis current command value Id* and q-axis current command value Iq*, respectively. The current PI control unit 307 calculates a voltage command value Vd* of the d axis and a voltage command value Vq* of the q axis (hereinafter referred to as a d-axis voltage command value and a q-axis voltage command value) which are command voltages, using the calculated deflections $\Delta$Id and $\Delta$Iq by the following equations (1) and (2). Also, in the present embodiment, since the current PI control is performed, the d-axis voltage command value Vd* is the same as a voltage Vd and the q-axis voltage command value Vq* is the same as a voltage Vq. Therefore, in the present embodiment, the d-axis voltage command value Vd* and the q-axis voltage command value Vq* are represented as the d-axis voltage command value Vd and the q-axis voltage command value Vq, respectively.

The current PI control unit 307 outputs the calculated d-axis voltage command value Vd and q-axis voltage command value Vq to the 2-phase/3-phase conversion unit 308.

$$Vd^* = Kp \times \Delta Id + Ki \times \int (\Delta Id) dt \quad (1)$$

$$Vq^* = Kp \times \Delta Iq + Ki \times \int (\Delta Iq) dt \quad (2)$$

Also, in equations (1) and (2), coefficients Kp and Ki are coefficients set in advance.

The 2-phase/3-phase conversion unit 308 calculates voltage command values Vu*, Vv*, and Vw* of the 3-phases by performing coordinate conversions on the d-axis voltage command value Vd and the q-axis voltage command value Vq output by the current PI control unit 307 using the detection angle $\theta$ detected by the resolver 20. Since the current PI control is performed as in the current PI control unit 307 and the voltage command values Vu*, Vv*, and Vw* are the same as voltages Vu, Vv, and Vw, the voltage command values are represented as Vu, Vv, and Vw.

The 2-phase/3-phase conversion unit 308 outputs the calculated voltage command values Vu, Vv, and Vw of the 3 phases to the duty calculation unit 309.

The voltage command values Vu, Vv, and Vw of the 3 phases output by the 2-phase/3-phase conversion unit 308 are input to the duty calculation unit 309. The duty calculation unit 309 calculates duty signals Du, Dv, and Dw representing driving current signals to be provided to the motor from the voltage command values Vu, Vv, and Vw of the 3 phases at a timing determined by a carrier frequency fc. The duty calculation unit 309 outputs the calculated duty signals Du, Dv, and Dw to the power conversion unit 310.

The power conversion unit 310 includes, for example, a power control element (power element) such as an insulated gate bipolar transistor (IGBT) element that performs switching to generate driving currents from the duty signals Du, Dv, and Dw. The power conversion unit 310 generates the driving currents of the 3 phases corresponding to the duty signals Du, Dv, and Dw output by the duty calculation unit 309 and supplies the generated driving currents of the 3 phases to the motor 10.

The control unit 401 of the offset correction device 40 controls a clutch of a vehicle so that the motor 10 is rotated in an unloaded state, for example, when the motor control system 1 is mounted on the vehicle. The control unit 401 outputs, to the velocity PI control unit 303, a velocity command value w by which the motor 10 in the unloaded state is rotated in a control region in which no d-axis current flows and the velocity of the motor 10 is not within a field-weakening control region.

The voltage measurement unit 402 measures a d-axis voltage command value Vd and a q-axis voltage command value Vq output by the voltage PI control unit 307. The voltage measurement unit 402 acquires the angular velocity ω output by the velocity calculation unit 302 and detects a rotation direction of the motor 10 based on the acquired angular velocity ω. The voltage measurement unit 402 outputs the measured d-axis voltage command value Vd, the measured q-axis voltage command value Vq, and the detected rotation direction to the offset calculation unit 403.

The d-axis voltage command value Vd, the q-axis voltage command value Vq, and the rotation direction output by the voltage measurement unit 402 are input to the offset calculation unit 403.

The offset calculation unit 403 calculates offset errors Δθ' (first and second correction values) based on the stored values, and the d-axis voltage command value Vd, the q-axis voltage command value Vq, and the rotation direction output by the voltage measurement unit 402, as will be described below.

Also, the calculated offset errors may be stored in a storage unit (not illustrated) of the motor control device 30 or the offset correction device 40.

Figure 2:
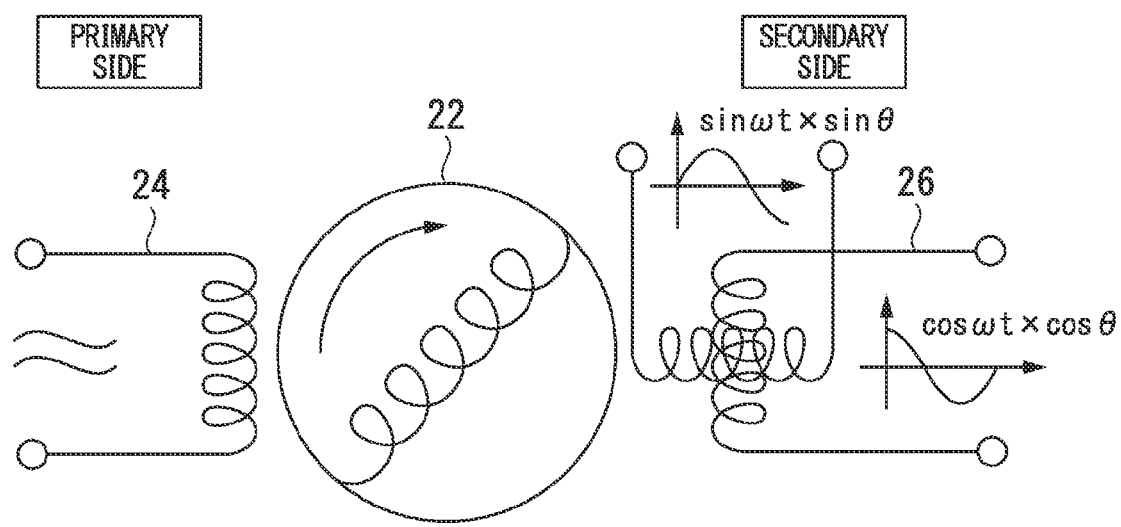
FIG. 2 is a diagram illustrating an overall constitution of a resolver according to the first embodiment.

FIG. 2 is a diagram illustrating an overall constitution of the resolver 20 according to the present embodiment.

As illustrated in FIG. 2, the resolver 20 is mounted on a through shaft of the motor 10 and is adjusted in accordance with a rotor magnetic field of the brushless motor. The resolver 20 includes a resolver rotor 22, a primary-side coil (rotor) 24, and two secondary-side coils (stator) 26 separated by 90 degrees from the primary side coil 24. When an alternating voltage is applied to the primary side, a voltage is also generated in the secondary-side coils. The amplitude of a voltage output to the secondary side is sin θ and cos θ when θ is a rotor angle.

The resolver 20 calculates a detection angle of the motor 10 based on signals of the secondary-side coils 26. The calculated detection angle has a monotonically and substantially linearly increasing value since inertia is large in an electric vehicle or the like and acceleration is negligible compared to a sampling time between one-time rotation (360 degrees) and a rotation criterion angle (0 degrees) of an electric angle of the motor 10. Accordingly, calculated values during a plurality of rotations of the motor 10 form, for example, a toothed wave shape. The resolver 20 can detect the detection angle of the electric angle of the motor 10 by the calculated values.

Figure 3:
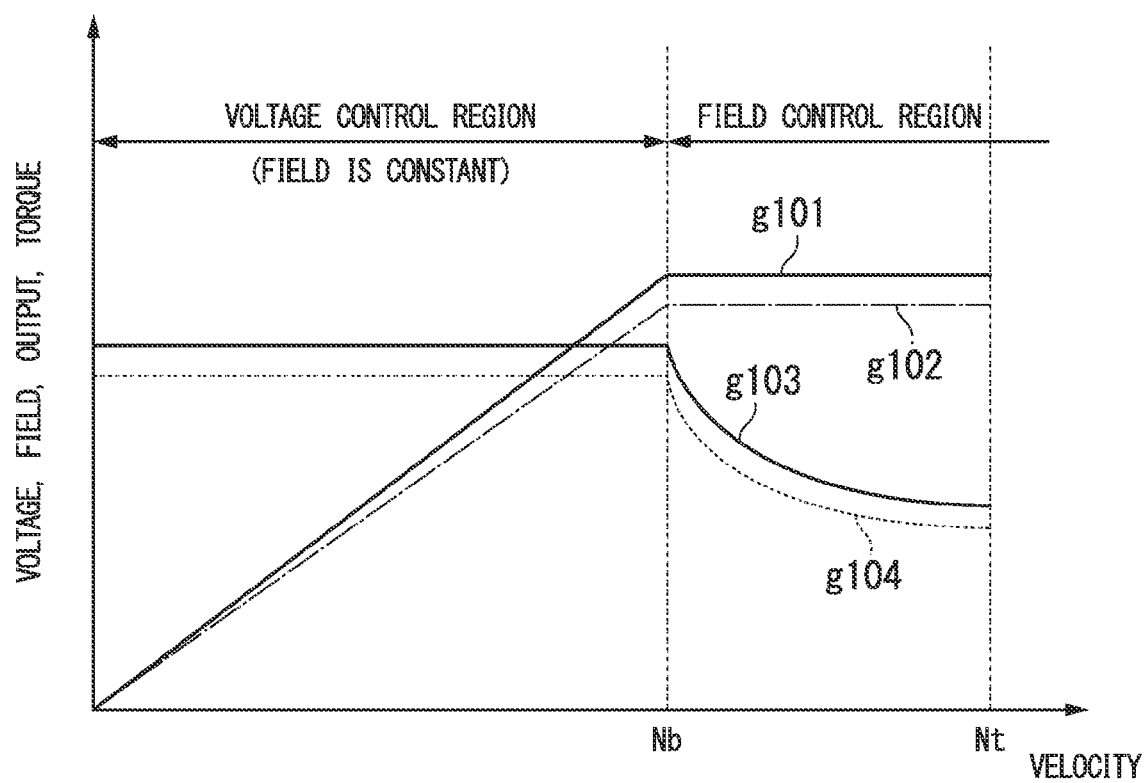
FIG. 3 is a diagram for describing a voltage control region.

FIG. 3 is a diagram for describing a voltage control region.

In FIG. 3, the horizontal axis represents a velocity and the vertical axis represents a voltage, a field, an output, and torque. Also, in FIG. 3, Nb is a base velocity and Nt is the maximum velocity. Further, the base velocity Nb refers to the maximum velocity in a voltage control region. Also, the maximum velocity Nt refers to the maximum velocity in the weakest field.

A curve g101 indicates a relation between a voltage and a velocity and a curve g102 indicates a relation between an output and a velocity. A curve g103 indicates a relation between a field and a velocity and a curve g104 indicates a relation between torque and a velocity.

As illustrated in FIG. 3, for example, voltage control is performed on the motor while constantly maintaining the field up to a predetermined rotation velocity (for example, the base velocity Nb), as in the curve g103. Thus, a region in which the voltage control is performed while constantly maintaining the field refers to a voltage control region. Also, in the voltage control region illustrated in FIG. 3, the d-axis current scarcely flows.

Further, in a region in which a velocity is equal to or greater than the predetermined rotation velocity, the rotation velocity is increased by weakening the field as in the curve g103 while constantly maintaining the voltage as in the curve g101. Such control refers to field-weakening control and such a region in which the voltage is constant and the rotation velocity becomes fast refers to a field-weakening control region (field control region).

Figure 4:
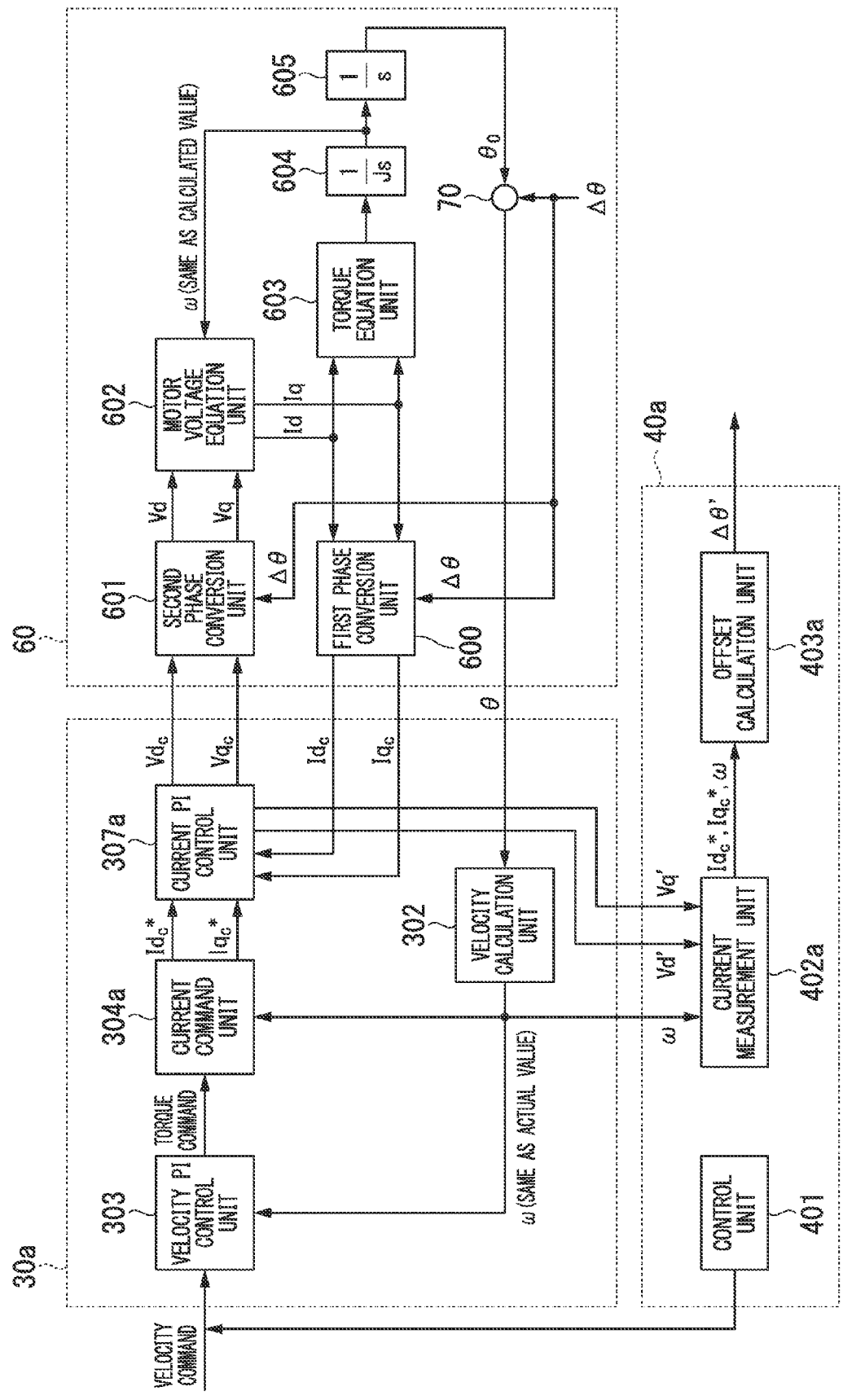
FIG. 4 is a control block diagram in a dq coordinate system and a control system $d_c q_c$ coordinate system according to the first embodiment.

FIG. 4 is a control block diagram in a dq coordinate system and a control system $d_c q_c$ coordinate system according to the present embodiment.

The control system $d_c q_c$ coordinate system refers to a coordinate system expressed by substituting the d and q axes in a motor control device 30a with $d_c$ and $q_c$ axes, respectively.

As illustrated in FIG. 4, the motor control device 30a includes a velocity calculation unit 302, a velocity PI control unit 303, a current command unit 304a, and a current PI control unit 307a. A control target 60 expressing the motor 10 and the resolver 20 in the d and q axes of the actual coordinates includes a first phase conversion unit 600, a second phase conversion unit 601, a motor voltage equation unit 602, a torque equation unit 603, a (1/Js) 604, a (1/s) 605, and an addition unit 70.

The offset correction device 40a includes a control unit 401, a voltage measurement unit 402a, and an offset calculation unit 403a.

The same operation units as those in FIG. 1 are denoted by the same reference numerals and the description thereof will be omitted.

The angular velocity ω output from the velocity calculation unit 302 and the torque command value τ* output by the velocity PI control unit 303 are input to the current command unit 304a of the motor control device 30a. The current command unit 304a generates a $d_c$-axis current command value $Id_c$* and a $q_c$-axis current command value $Iq_c$* from the torque command value τ* and the angular velocity ω. The current command unit 304a outputs the generated $d_c$-axis current command value $Id_c$* and $q_c$-axis current command value $Iq_c$* to the current PI control unit 307a.

The current PI control unit 307a calculates a $d_c$-axis voltage command value $Vd_c$ and a $q_c$-axis voltage command value $Vq_c$ from the input d-axis current command value $Id_c$* and q-axis current command value $Iq_c$* based on a $d_c$-axis current $Id_c$ and a $q_c$-axis current $Iq_c$.

The first phase conversion unit 600 of the control target 60 is a conversion unit for converting a current of the d and q axes into a current of the $d_c$ and $q_c$ axes. The first phase conversion unit 600 is subjected to coordinate conversion by an actual offset error Δθ so that a d-axis current Id and a q-axis current Iq are converted into a $d_c$-axis current $Id_c$ and a $q_c$-axis current $Iq_c$, respectively. The first phase conversion unit 600 outputs the converted $d_c$-axis current $Id_c$ and $q_c$-axis current $Iq_c$ to the current PI control unit 307a.

Here, when a delay value $|\omega|\Delta t$ is omitted, the first phase conversion unit 600 is expressed as in the following equation (3).

[Math. 4]

$$\begin{bmatrix} Id_c \\ Iq_c \end{bmatrix} = \begin{bmatrix} \cos(\Delta\theta) & \sin(\Delta\theta) \\ -\sin(\Delta\theta) & \cos(\Delta\theta) \end{bmatrix} \begin{bmatrix} Id \\ Iq \end{bmatrix} \quad (3)$$

The second phase conversion unit 601 is a conversion unit for converting a voltage of the $d_c$ and $q_c$ axes into a voltage of the d and q axes. The second phase conversion unit 601 is subjected to coordinate conversion by an offset error $\Delta\theta$ so that a $d_c$-axis voltage $Vd_c$ and a $q_c$-axis voltage $Vq_c$ are converted into a d-axis voltage Vd and a q-axis voltage Vq, respectively. The second phase conversion unit 601 outputs the converted d-axis voltage Vd and q-axis voltage Vq to the motor voltage equation unit 602.

Here, when a delay value $|\omega|\Delta t$ is omitted, the second phase conversion unit 601 is expressed as an inverse matrix of equation (3) as in the following equation (4).

[Math. 5]

$$\begin{bmatrix} Vd \\ Vq \end{bmatrix} = \begin{bmatrix} \cos(\Delta\theta) & -\sin(\Delta\theta) \\ \sin(\Delta\theta) & \cos(\Delta\theta) \end{bmatrix} \begin{bmatrix} Vd_c \\ Vq_c \end{bmatrix} \quad (4)$$

The d-axis voltage Vd and the q-axis voltage Vq output by the second phase conversion unit 601 and angular velocities $\omega$ calculated by the torque equation unit 603 and the (1/Js) 604 are input to the motor voltage equation unit 602.

A voltage equation of the motor 10 included in the motor voltage equation unit 602 is expressed as in the following equation (5) (for example, see Reference Document 1: Vector Control Technology of Permanent Magnet Synchronous Motor, First Volume, by Shinji Shinnaka p 98 published in 2008 by Dempa Publications, Inc.).

[Math. 6]

$$\begin{bmatrix} Vd \\ Vq \end{bmatrix} = \begin{bmatrix} Ra+pLd & -\omega Lq \\ \omega Ld & Ra+pLq \end{bmatrix} \begin{bmatrix} Id \\ Iq \end{bmatrix} + \begin{bmatrix} 0 \\ \omega\Phi a \end{bmatrix} \quad (5)$$

In equation (5), $\omega$ is an angular velocity, $\Phi a$ is an interlinkage magnetic flux of the motor 10, and $\omega\Phi a$ is an induced voltage. Ld is inductance of the d axis and Lq is inductance of the q axis. Ra is resistance per wiring one-phase of the motor 10.

Also, in equation (5), p is a differential operator. Therefore, in a steady state, equation (5) is expressed as in the following equation (6).

[Math. 7]

$$\begin{bmatrix} Vd \\ Vq \end{bmatrix} = \begin{bmatrix} Ra & -\omega Lq \\ \omega Ld & Ra \end{bmatrix} \begin{bmatrix} Id \\ Iq \end{bmatrix} + \begin{bmatrix} 0 \\ \omega\Phi a \end{bmatrix} \quad (6)$$

The motor voltage equation unit 602 calculates the d-axis current Id and the q-axis current Iq using equation (5) or (6) and outputs the calculated d-axis current Id and q-axis current Iq to the first phase conversion unit 600 and the torque equation unit 603.

The torque equation unit 603 calculates torque using a torque equation (see Reference Document 2: Generalized Analysis of Operating Limits of PM Motor and Suitable Machine Parameters for Constant Power Operation by Morimoto and Takeda Published in IEEJ Transactions D Vol. 117, No. 6, pp. 751 to 757 (1997-6)) of the following equation (7) of the torque equation unit 603 and the d-axis current Id and the q-axis current Iq output by the motor voltage equation unit 602, and then outputs the calculated torque value to the (1/Js) 604. Also, the torque equation unit 603 stores the inductance component Ld of the d axis, the inductance component Lq of the q axis, and the interlinkage magnetic flux $\Phi a$.

[Math. 8]

$$\text{TORQUE} = Pn\{\Phi a \cdot Iq + (Ld-Lq)Id \cdot Iq\} \quad (7)$$

In equation (7), Pn is the number of pole pairs which is the number of pairs of magnetic poles of magnets of the motor 10 or the stator.

The (1/Js) 604 outputs the angular velocity $\omega$ from the torque calculated by the torque equation unit 603 and outputs the output angular velocity $\omega$ to the motor voltage equation unit 602 and the (1/s) 605. Also, J is inertia (a moment of inertia) of the motor 10 when unloaded.

The (1/s) 605 outputs an actual angle $\theta_0$ from the angular velocity $\omega$ output by the (1/Js) 604 to the addition unit 70. The addition unit 70 adds the offset error $\Delta\theta$ and the actual angle $\theta_0$ output by the (1/s) 605 and outputs the added detection signal $\theta$ to the velocity calculation unit 302 of the motor control device 30a.

The voltage measurement unit 402a of the offset correction device 40a measures the $d_c$-axis voltage command value $Vd_c$ and the $q_c$-axis voltage command value $Vq_c$ output by the current PI control unit 307a. The voltage measurement unit 402a acquires the angular velocity $\omega$ output by the velocity calculation unit 302 and detects a rotation direction of the motor 10 based on the acquired angular velocity $\omega$. The voltage measurement unit 402a outputs the measured $d_c$-axis voltage command value $Vd_c$, the measured $q_c$-axis voltage command value $Vq_c$, and information indicating the detected rotation direction of the motor 10 to the offset calculation unit 403a.

The $d_c$-axis voltage command value $Vd_c^*$ the $q_c$-axis voltage command value $Vq_c^*$, and the information indicating the rotation direction of the motor 10 output by the voltage measurement unit 402a are input to the offset calculation unit 403a.

The offset calculation unit 403a calculates an offset error correction value $\Delta\theta'$ based on the information indicating the rotation direction of the motor 10, the $d_c$-axis voltage command value $Vd_c^*$, the $q_c$-axis voltage command value $Vq_c^*$ output by the voltage measurement unit 402a.

Next, a vector relation between a current and a voltage in the dq coordinate system will be described.

A d-axis voltage and a q-axis voltage are expressed as the following equations (8) and (9) from equation (6).

$$Vd = RaId - \omega LqIq \quad (8)$$

$$Vq = \omega LdId + RaIq + \omega\Phi a \quad (9)$$

Figure 5:
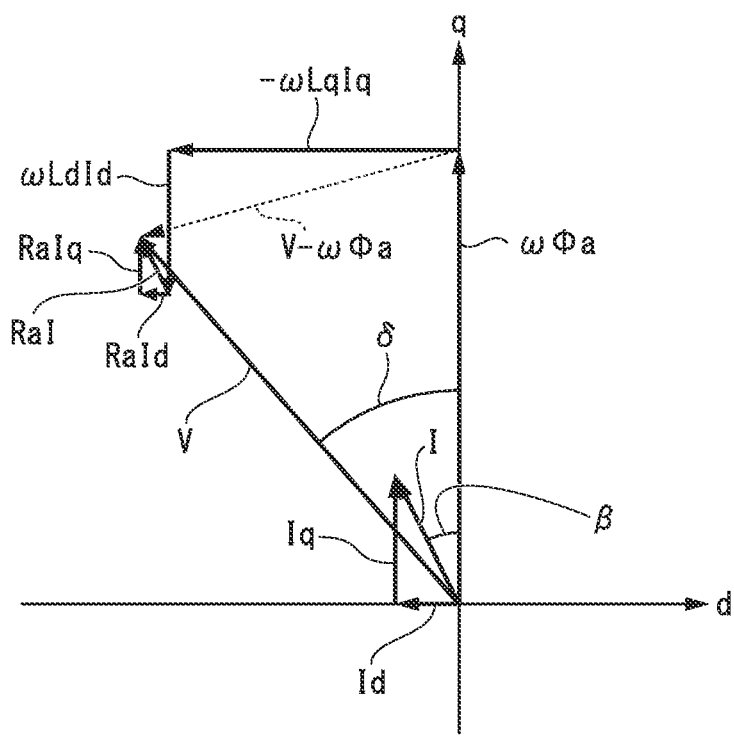
FIG. 5 is a vector diagram of a current and a voltage in the dq coordinate system.

FIG. 5 is a vector diagram of a current and a voltage in the dq coordinate system.

In FIG. 5, an angle δ is an internal phase difference angle (load angle) and is an angle formed by the q axis and a vector (hereinafter referred to as a voltage vector V) of the voltage V.

In FIG. 5, a counterclockwise direction is the positive rotation direction and the q axis is advanced 90 degrees from the d axis.

As illustrated in FIG. 5, the voltage vector V applied to the motor 10 can be decomposed into a vector (hereinafter referred to as a vector Vd) of the d-axis voltage Vd (=−V sin δ) and a vector (hereinafter referred to as a vector Vq) of a q-axis voltage Vq (=V cos δ).

A current vector I flowing in the motor 10 can be decomposed into a vector (hereinafter referred to as a vector Id) of the d-axis current Id and a vector (hereinafter referred to as a vector Iq) of the q-axis current Iq.

As illustrated in FIG. 5, the vector Vd (=−V sin δ) shown in equation (8) is expressed as a sum of a vector RaId and a vector (−ωLqIq). Also, a vector Vq (=V cos δ) shown in equation (9) is expressed as a sum of a vector ωLdId, a vector RaIq, and a vector ωΦa.

When there is no error due to assembly of the resolver 20, no error due to manufacturing, no error occurring by delay of the motor control device 30a, or the like, the d and q axes illustrated in FIG. 5 are identical to the $d_c$ and $q_c$ axes of the motor control device 30a.

In FIG. 5, the relation between the vectors when there is no offset error in the resolver 20 and the d and q axes are identical to the $d_c$ and $q_c$ axes of the control system coordinates has been described.

Next, a relation between the vectors when there is an offset error in the resolver 20 and the d and q axes are not identical to the $d_c$ and $q_c$ axes of the control system coordinates will be described with reference to FIGS. 6 and 7.

Figure 6:
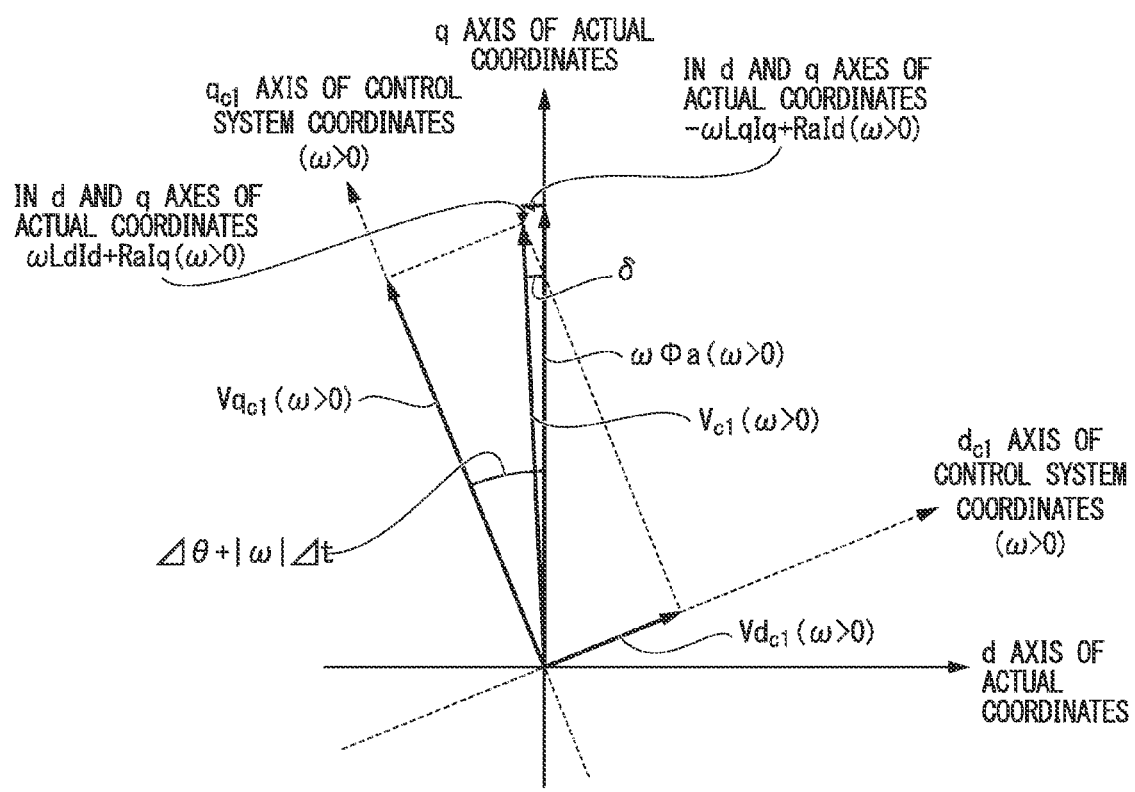
FIG. 6 is a diagram for describing an example of a relation between voltage vectors when an angular velocity is positive according to the first embodiment.

FIG. 6 is a diagram for describing an example of the relation between the voltage vectors when the angular velocity is positive according to the present embodiment. FIG. 7 is a diagram for describing an example of the relation between the voltage and the vector when the angular velocity is negative according to the present embodiment.

Figure 7:
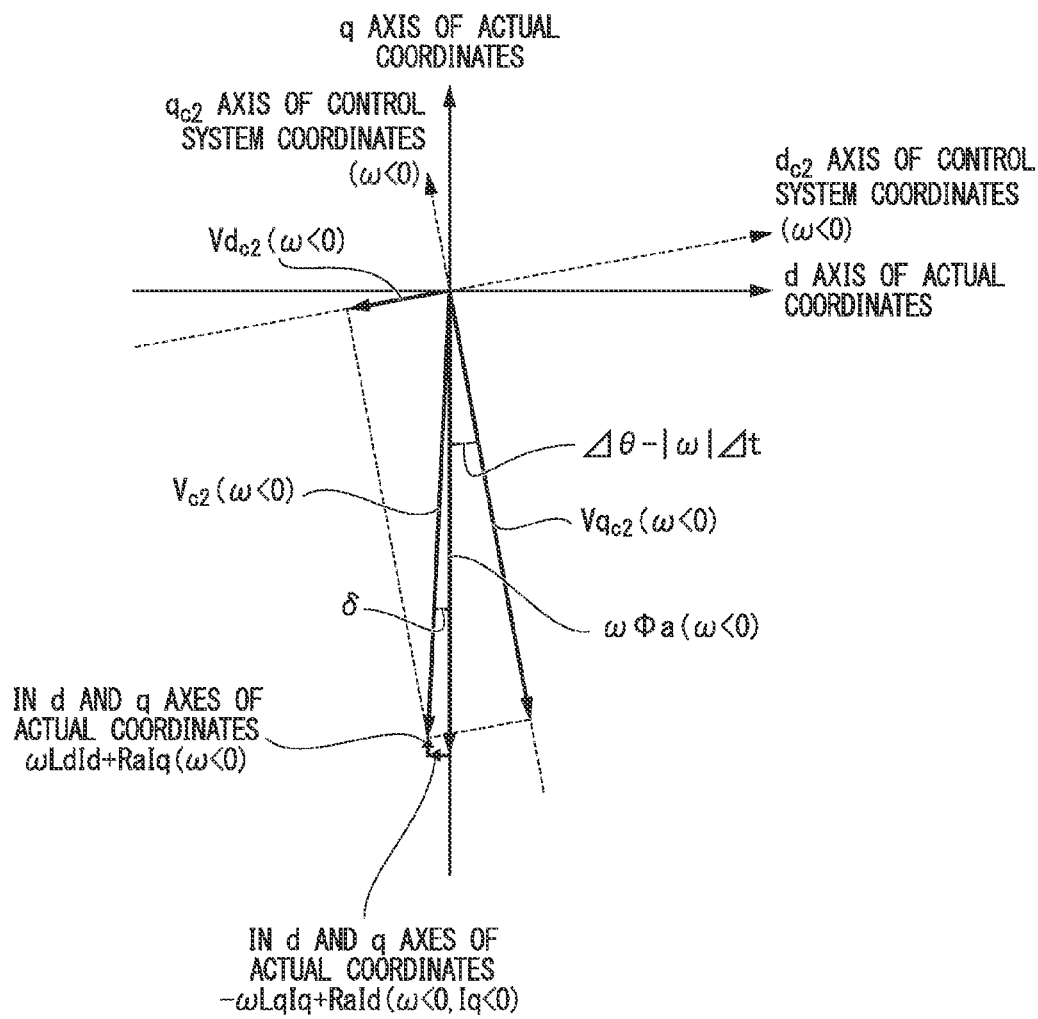
FIG. 7 is a diagram for describing an example of the relation between the voltage vectors when the angular velocity is negative according to the first embodiment.

In FIGS. 6 and 7, d-q coordinates indicate dq coordinates (hereinafter referred to as actual coordinates d-q) in which an actual field direction of the rotor is the d axis, and $d_c$-$q_c$ coordinates indicate dq coordinates (which are hereinafter referred to as control system coordinates $d_c$-$q_c$ and the d and q axes in the control system coordinates $d_c$-$q_c$ are referred to as $d_c$ and $q_c$ axes) determined by a magnetic pole position (hereinafter referred to as a resolver detection position) detected by the resolver 20. Also, control system coordinates $d_c$-$q_c$ when the angular velocity ω is positive (positive rotation) are shown as control system coordinates $d_{c1}$-$q_{c1}$, and control system coordinates $d_c$-$q_c$ when the angular velocity ω is negative (negative rotation) are shown as control system coordinates $d_{c2}$-$q_{c2}$.

First, a case in which the angular velocity ω is positive, that is, the motor 10 is positively rotated, will be described with reference to FIG. 6.

A state illustrated in FIG. 6 is a state in which the motor 10 is rotated by the motor control device 30a in FIG. 4 in the control region in which no d-axis current is generated and the velocity of the motor 10 is not within the field-weakening control region so that an angular velocity of the motor 10 set to be in the unloaded state is positive.

As illustrated in FIG. 6, the $q_{c1}$ axis of the control system is assumed to advance by an angle (the offset error Δθ+the delay value |ω|Δt) with respect to the q axis of the actual coordinates.

In the actual coordinates d-q, an induced-voltage vector ωΦa is generated in the positive direction of the q axis when the motor 10 in the unloaded state is positively rotated. Also, in regard to the voltage components by the d-axis current Id and the q-axis current Iq, a voltage vector (ωLdId+RaIq) is generated in the negative direction of the q axis so that the induced-voltage vector ωΦa is suppressed. Therefore, the q-axis voltage vector Vq is a resultant vector of the voltage vector (ωLdId+RaIq) and the induced-voltage vector ωΦa. Also, a d-axis voltage vector Vd (=−ωLqIq+RaId) is generated in the negative direction of the d axis.

As illustrated in FIG. 6, in the control system coordinates $d_{c1}$-$q_{c1}$, the voltage vector is expressed as a voltage vector $V_{c1}$ that is advanced by the angle δ with respect to the d axis of the actual coordinates. Also, the voltage vector $V_{c1}$ is a voltage of the motor 10. The voltage vector $V_{c1}$ can be decomposed into a voltage vector $Vd_{c1}$ in the positive direction of the $d_{c1}$ axis and a voltage vector $Vq_{c1}$ in the positive direction of the $q_{c1}$ axis.

Also, as illustrated in FIG. 6, an angle formed by the voltage vector $V_{c1}$ and the voltage vector $Vq_{c1}$ is a difference between (the offset error Δθ+the delay value |ω|Δt) and (the angle δ formed by the induced-voltage vector ωΦa and the voltage vector $V_{c1}$).

Next, a case in which the angular velocity ω is negative, that is, the motor 10 is negatively rotated (reversely rotated) will be described with reference to FIG. 7.

A state illustrated in FIG. 7 is a state in which the motor 10 is rotated by the motor control device 30a in FIG. 4 in the control region in which the velocity of the motor is not within the field-weakening control region so that an angular velocity of the motor 10 set to be in the unloaded state is negative.

As illustrated in FIG. 7, when the motor 10 in the unloaded state is negatively rotated in the actual coordinates d-q, the induced-voltage vector ωΦa is generated in the negative direction of the q axis. Also, in regard to the voltage components by the d-axis current Id and the q-axis current Iq, a voltage vector (ωLdId+RaIq) is generated in the positive direction of the q axis so that the induced-voltage vector ωΦa is suppressed. Therefore, the q-axis voltage vector Vq is a resultant vector of the voltage vector (ωLdId+RaIq) and the induced-voltage vector ωΦa. Also, a d-axis voltage vector Vd (=−ωLqIq+RaId) is generated in the negative direction of the d axis.

As illustrated in FIG. 7, in the control system coordinates $d_{c2}$-$q_{c2}$, the voltage vector is expressed as a voltage vector $V_{c2}$ that is delayed by the angle δ with respect to the d axis of the actual coordinates. Also, the voltage vector $V_{c2}$ is a voltage of the motor 10. The voltage vector $V_{c2}$ can be decomposed into a voltage vector $Vd_{c2}$ in the positive direction of the $d_{c2}$ axis and a voltage vector $Vq_{c2}$ in the positive direction of the $q_{c2}$ axis.

Also, as illustrated in FIG. 7, an angle formed by the voltage vector $V_{c2}$ and the voltage vector $Vq_{c2}$ is a sum of (the offset error Δθ+the delay value |ω|Δt) and (the angle δ formed by the induced-voltage vector ωΦa and the voltage vector $V_{c2}$).

Next, a method of calculating the offset error correction value Δθ' from the current vectors at the time of the positive rotation and the negative rotation of the motor 10 illustrated in FIGS. 6 and 7 will be described with reference to FIG. 8.

Figure 8:
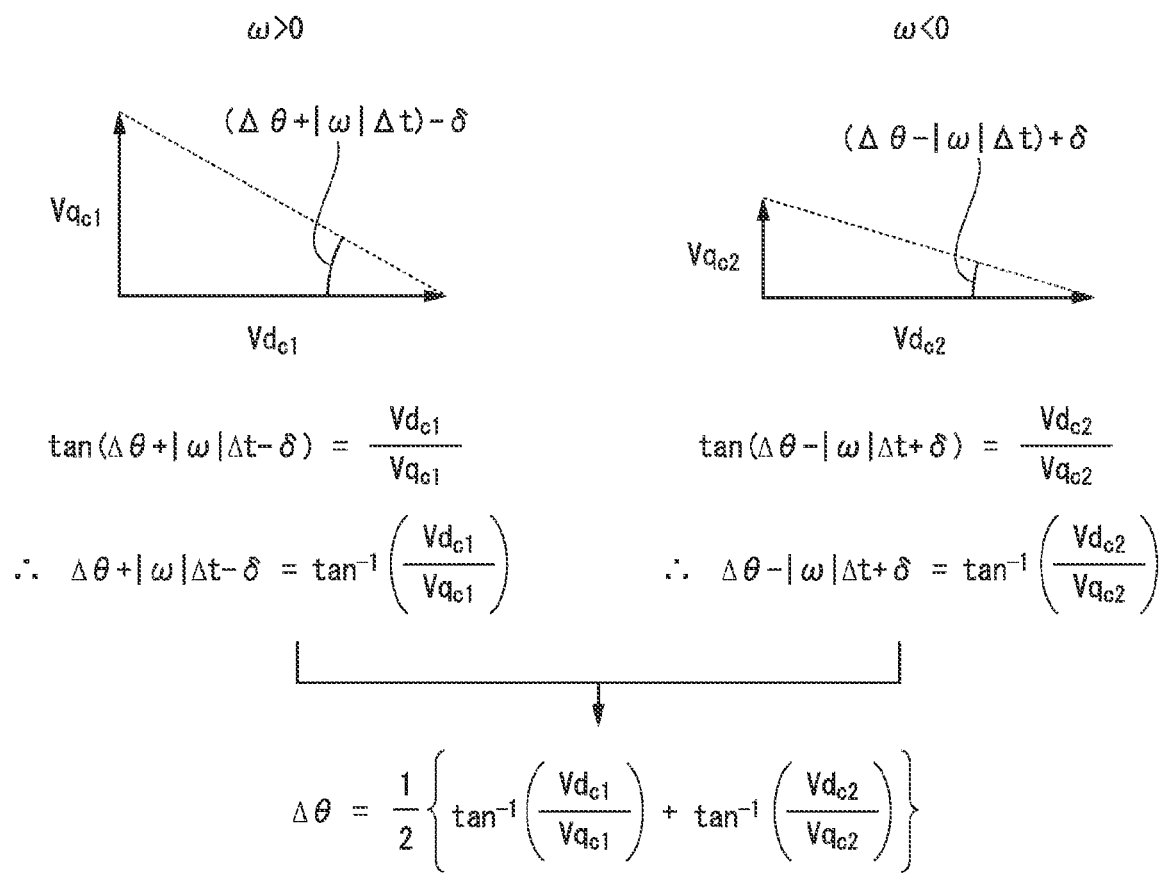
FIG. 8 is a diagram for describing a method of calculating an offset error correction value when a motor is rotated in a control region in which a velocity of the motor is not within a field-weakening control region according to the first embodiment.

FIG. 8 is a diagram for describing a method of calculating an offset error correction value when a motor is rotated in a control region which a velocity of the motor is not within a field-weakening control region according to the present embodiment.

As illustrated in FIG. 8, when the motor 10 is positively rotated (ω>0), an angle formed by the $d_{c1}$-axis voltage vector $Vd_{c1}$ and the $q_{c1}$-axis voltage vector $Vq_{c1}$ is the difference between (the offset error Δθ+the delay value |ω|Δt) and (the angle δ formed by the induced-voltage vector ωΦa and the voltage vector $V_{c2}$), as described with reference to FIG. 6. Therefore, a relation among the formed angle, the $d_{c1}$-axis voltage vector $Vd_{c1}$, and the $q_{c1}$-axis voltage vector $Vq_{c1}$ is expressed as in the following equations (10) and (11).

$$\tan(\Delta\theta+|\omega|\Delta t-\delta)=Vd_{c1}/Vq_{c1}$$

$$\Delta\theta+|\omega|\Delta t-\delta=\tan^{-1}(Vd_{c1}/Vq_{c1}) \quad (11)$$

On the other hand, as illustrated in FIG. 8, when the motor 10 is negatively rotated (ω<0), an angle formed by the $d_{c2}$-axis voltage vector $Vd_{c2}$ and the $q_{c2}$-axis voltage vector $Vq_{c2}$ is the sum of (the offset error Δθ+the delay value |ω|Δt) and (the angled δ formed by the induced-voltage vector ωΦa and the voltage vector $V_{c2}$), as described with reference to FIG. 7. Therefore, a relation among this formed angle, the $d_{c2}$-axis voltage vector $Vd_{c2}$ and the $q_{c2}$-axis voltage vector $Vq_{c2}$ is expressed as in the following equations (12) and (13).

$$\tan(\Delta\theta-|\omega|\Delta t+\delta)=Vd_{c2}/Vq_{c2} \quad (12)$$

$$\Delta\theta-|\omega|\Delta t+\delta=\tan^{-1}(Vd_{c2}/Vq_{c2}) \quad (13)$$

From equations (11) and (13), the correction value Δθ' of the offset error Δθ can be calculated by the following equation (14).

[Math. 9]

$$\Delta\theta' = \frac{1}{2}\left\{\tan^{-1}\left(\frac{Vd_{c1}}{Vq_{c1}}\right)+\tan^{-1}\left(\frac{Vd_{c2}}{Vq_{c2}}\right)\right\} \quad (14)$$

Equation (14) expresses that the offset error correction value Δθ' is calculated when a voltage command value is measured at the time of the positive rotation of the motor 10 and a voltage command is measured at the time of the negative rotation thereof.

That is, the offset calculation unit 403a measures the $d_{c1}$-axis voltage command value $Vd_{c1}$ and the $q_{c1}$-axis voltage command value $Vq_{c1}$ when the motor 10 set to be in the unloaded state is positively rotated. Next, the offset calculation unit 403a measures the $d_{c2}$-axis voltage command value $Vd_{c2}$ and the $q_{c2}$-axis voltage command value $Vq_{c2}$ when the motor 10 set to be in the unloaded state is negatively rotated. Next, the offset calculation unit 403a calculates the offset error correction value Δθ' by substituting the measured current command values into equation (14).

Also, in the present embodiment, for example, the absolute values of the numbers of rotations of the positive rotation and the negative rotation of the motor 10 are set to be the same using equation (14) to remove the influences of the delay value |ω|Δt and the angle δ, and the voltage command values are measured.

Next, a calculation procedure of the offset error correction value Δθ' will be described with reference to FIGS. 4, 8, and 9.

Also, the following calculation of the offset error correction value may be performed when the motor control system 1 is mounted on a vehicle, e.g., when a vehicle is assembled, a vehicle is inspected, or the motor 10 or the motor control device 30 is exchanged.

Figure 9:
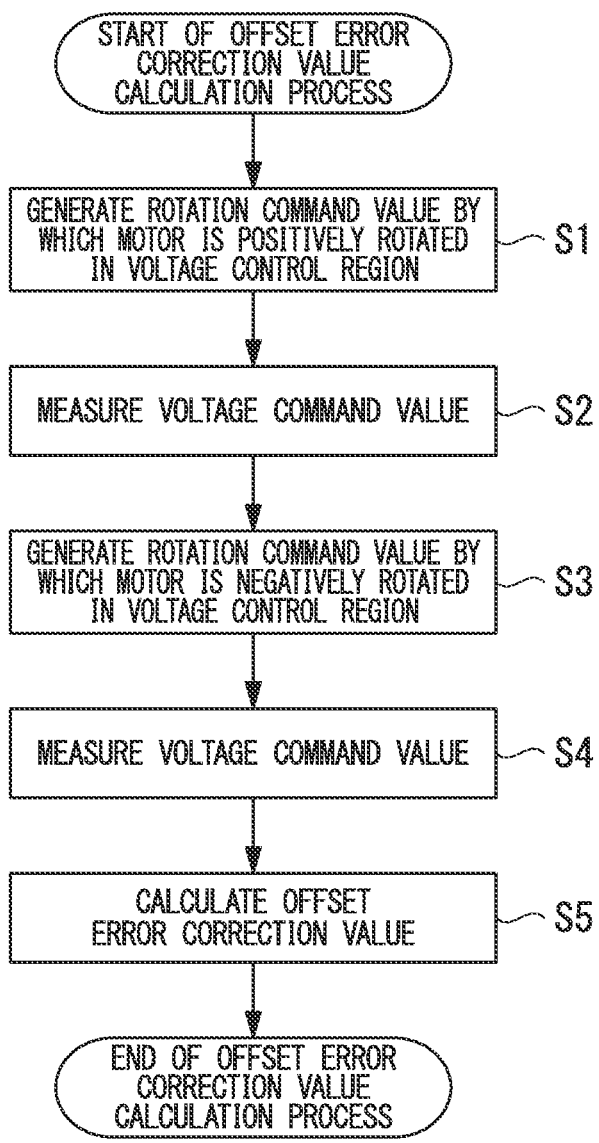
FIG. 9 is a flowchart illustrating a calculation order of the offset error correction value according to the first embodiment.

FIG. 9 is a flowchart illustrating the calculation procedure of the offset error correction value according to the present embodiment.

(Step S1) The control unit 401 generates a velocity command value by which the motor 10 is positively rotated in the control region in which the velocity of the motor 10 is not within the field-weakening control region, and outputs the generated velocity command value to the motor control device 30a. Also, since the motor 10 is rotated in the unloaded state, the q-axis current Iq is minute. Further, since the motor 10 is rotated in the control region in which the velocity of the motor 10 is not within the field-weakening control region, the d-axis current scarcely flows. After step S1 ends, the process proceeds to step S2.

(Step S2) The voltage measurement unit 402a measures the $d_{c1}$-axis voltage command value $Vd_{c1}$ and the $q_{c1}$-axis voltage command value $Vq_{c1}$ and outputs the measured $d_{c1}$-axis voltage command value $Vd_{c1}$ and $q_{c1}$-axis voltage command value $Vq_{c1}$ to the offset calculation unit 403a.

Next, the voltage measurement unit 402a acquires the angular velocity ω output by the velocity calculation unit 302 and detects the rotation direction based on the acquired angular velocity ω. In step S2, the voltage measurement unit 402a detects the positive direction (positive rotation) as the rotation direction. Next, the voltage measurement unit 402a outputs the detected rotation direction to the offset calculation unit 403a. After step S2 ends, the process proceeds to step S3.

(Step S3) The control unit 401 generates a velocity command value by which the motor 10 is negatively rotated in the control region in which the velocity of the motor 10 is not within the field-weakening control region, and outputs the generated velocity command value to the motor control device 30a. After step S3 ends, the process proceeds to step S4.

(Step S4) The voltage measurement unit 402a measures the $d_{c2}$-axis voltage command value $Vd_{c2}$ and the $q_{c2}$-axis voltage command value $Vq_{c2}$ and outputs the measured $d_{c2}$-axis voltage command value $Vd_{c2}$ and $q_{c2}$-axis voltage command value $Vq_{c2}$ to the offset calculation unit 403a.

Next, the voltage measurement unit 402a acquires the angular velocity ω output by the velocity calculation unit 302 and detects the rotation direction based on the acquired angular velocity ω. In step S4, the voltage measurement unit 402a detects the negative direction (negative rotation) as the rotation direction. Next, the voltage measurement unit 402a outputs the detected rotation direction to the offset calculation unit 403a. After step S4 ends, the process proceeds to step S5.

(Step S5) The offset calculation unit 403a calculates the offset error correction values Δθ' (the first and second correction values) using equation (14) based on the measured current command values and the detected rotation direction.

The above-described offset error correction value calculation process ends.

Also, in equation (14), the example in which the magnitudes of the d-axis voltage and the q-axis voltage are different between the time of the positive rotation of the motor 10 and the time of the negative rotation thereof has been described, but the present invention is not limited thereto. The d-axis current "Id=0" and the q-axis current "Iq=0" can be considered in the actual coordinates d-q. Further, when signal delay from the detection signal by the resolver 20 to the power conversion unit 310 is sufficiently corrected, "δ=0" and "|ω|Δt=0" can be considered. Therefore, for example, the offset calculation unit 403a may measure only the $d_{c1}$-axis voltage command value $Vd_{c1}$ and the $q_{c1}$-axis voltage command value $Vq_{c1}$ at the time of the positive rotation of the motor 10 and may calculate the offset error correction values Δθ' by the following equation (15).

[Math. 10]

$$\Delta\theta' = \tan^{-1}\left(\frac{Vd_{c1}}{Vq_{c1}}\right) \quad (15)$$

Alternatively, the offset calculation unit 403a may measure only the $d_{c2}$-axis voltage command value $Vd_{c2}$ and the $q_{c2}$-axis voltage command value $Vc_{c2}$ at the time of the negative rotation of the motor 10 and may calculate the offset error correction values $\Delta\theta'$.

Next, actual measurement results will be described with reference to FIGS. 10A to 10D.

FIGS. 10A to 10D are diagrams for describing examples of results obtained by calculating an offset error using an actual device according to the present embodiment.

<<Actual Measurement Method>>

Procedure 1: Internal data of the motor control device 30b is measured when the motor in an unloaded state is rotated by the velocity command value of +1000 [rpm].

Procedure 2: Internal data of the motor control device 30b is measured when the motor in an unloaded state is rotated by a velocity command value of −1000 [rpm].

Procedure 3: An offset error correction value is calculated from the $d_c$-axis voltage command values $Vd_c$ and the $q_c$-axis voltage command values $Vq_c$ measured in Procedures 1 and 2.

Procedure 4: +30 [deg] is added to an offset error and measurement is performed in Procedures 1 to 3.

Procedure 5: −30 [deg] is added to an offset error and measurement is performed in Procedures 1 to 3.

FIGS. 10A and 10B show actual measurement results of Procedures 1 to 3. That is, the results obtained by measuring effects of the present embodiment in respect to the offset error of an actual device are shown. As the measurement result, the offset error of the actual device is +1.7 [deg].

FIGS. 10C and 10D show actual measurement results of Procedure 4. That is, the results obtained by measuring effects are shown when an offset error of +30 [deg] is added in addition to the offset error of the actual device.

In FIGS. 10A and 10C, the first row indicates measurement items. The second row indicates actually measured values of the internal data of the motor control device 30b when the number of rotations is +1000 [rpm]. The third row indicates actually measured values of the internal data of the motor control device 30b when the number of rotations is −1000 [rpm].

In FIGS. 10B and 10D, the first row indicates an item. The second row indicates a calculated value of the offset error correction value when the number of rotations is +1000 [rpm]. The third row indicates a calculated value of the offset error correction value of the motor control device 30b when the number of rotations is −1000 [rpm]. Also, the calculated values in FIGS. 10B and 10D are values calculated by substituting the measured values illustrated in FIGS. 10A and 10C into $\tan^{-1}(Vd_c/Vq_c)$.

As illustrated in FIG. 10B, when the actual device has an offset error of 1.7 [deg], the offset error correction value only in the positive rotation is −2.7 [deg] and the offset error correction value only in the negative rotation is +6.5 [deg]. Next, an average of the offset error correction values of the positive rotation and the negative rotation calculated using equation (14) is +1.9 [deg], as in FIG. 10B. That is, even when a sum of the offset errors of the actual device is +1.7 [deg], correction precision of (the offset error−the offset error correction value) can be suppressed to +0.2 [deg] according to the present embodiment.

Next, as illustrated in FIG. 10D, when an offset error of +30 [deg] is added to 1.7 [deg], the offset error correction value only in the positive rotation is +27.2 [deg] and the offset error correction value only in the negative rotation is +36.6 [deg]. Next, a calculated average of the offset error correction values of the positive rotation and the negative rotation is +31.9 [deg], as in FIG. 10D. That is, even when a sum of the offset errors of the actual device is +31.7 (=1.7+30) [deg], correction precision of (the offset error−the offset error correction value) can be suppressed to +0.2 [deg] according to the present embodiment.

Likewise, when an offset error of −30 [deg] is added in addition to the offset error of the actual device (Procedure 5), the offset error correction value only in the positive rotation is −32.9 [deg], the offset error correction value only in the negative rotation is −23.6 [deg], and an average is −28.2 [deg]. That is, even when a sum of the offset errors of the actual device is −28.3 (=1.7−30) [deg], correction precision of (the offset error−the offset error correction value) can be suppressed to −0.1 [deg] according to the present embodiment.

The correction precision of the offset error is suppressed compared to the case of only the positive rotation or only the negative rotation because an influence due to a delay element of the motor control device 30b or the like is cancelled by calculating the average of the offset error correction values of the positive rotation and the negative rotation. Thus, according to the present embodiment, the correction precision of the offset error can be suppressed with high precision.

As described above, the offset calculation unit 403a positively and negatively rotates the motor 10 in the unloaded state at the constant speed in the control region in which the velocity of the motor 10 is not within the field-weakening control region. Then, the offset calculation unit 403a measures the d-axis voltage command value and the q-axis voltage command value at the time of the constant speed rotation in the unloaded state and in the control region in which the velocity of the motor 10 is not within the field-weakening control region. Then, the offset calculation unit 403a is configured to calculate the offset error correction value by averaging $\tan^{-1}(Vd/Vq)$ of the measured voltage command values in the rotation directions using equation (14) and cancelling $|\omega|\Delta t$ or the like, which is a delay element, from the angle formed by the current vectors including an offset error.

As a result, in the motor control system 1 according to the present embodiment, since the motor 10 in the unloaded state is rotated in the positive direction and the reverse direction, an offset error can be corrected with higher precision compared to the technologies of the related art in which a motor is rotated only in the positive direction. In the motor control system 1 according to the present embodiment, the rotation of the motor 10 is controlled by the velocity command value of the offset correction device 40. Therefore, for example, also when the motor 10 is driven only by electricity as opposed to that of a hybrid car using gasoline and electricity, a current command value can be measured by positively and negatively rotating the motor 10 and an offset control value can be calculated.

By adding the offset error correction value calculated in this way to the detection signal detected by the resolver 20 and controlling the motor 10, it is possible to perform the control of the motor 10 by which the offset error is corrected with high precision.

Second Embodiment

Next, a method of suppressing an influence of a high-frequency component and noise due to an offset error will be described with reference to FIGS. 4 and 11. In a motor control device according to the present embodiment, the configuration of the current PI control unit 307a in the motor control system illustrated in FIG. 4 is different.

First, an overview of the present embodiment will be described.

Figure 11:
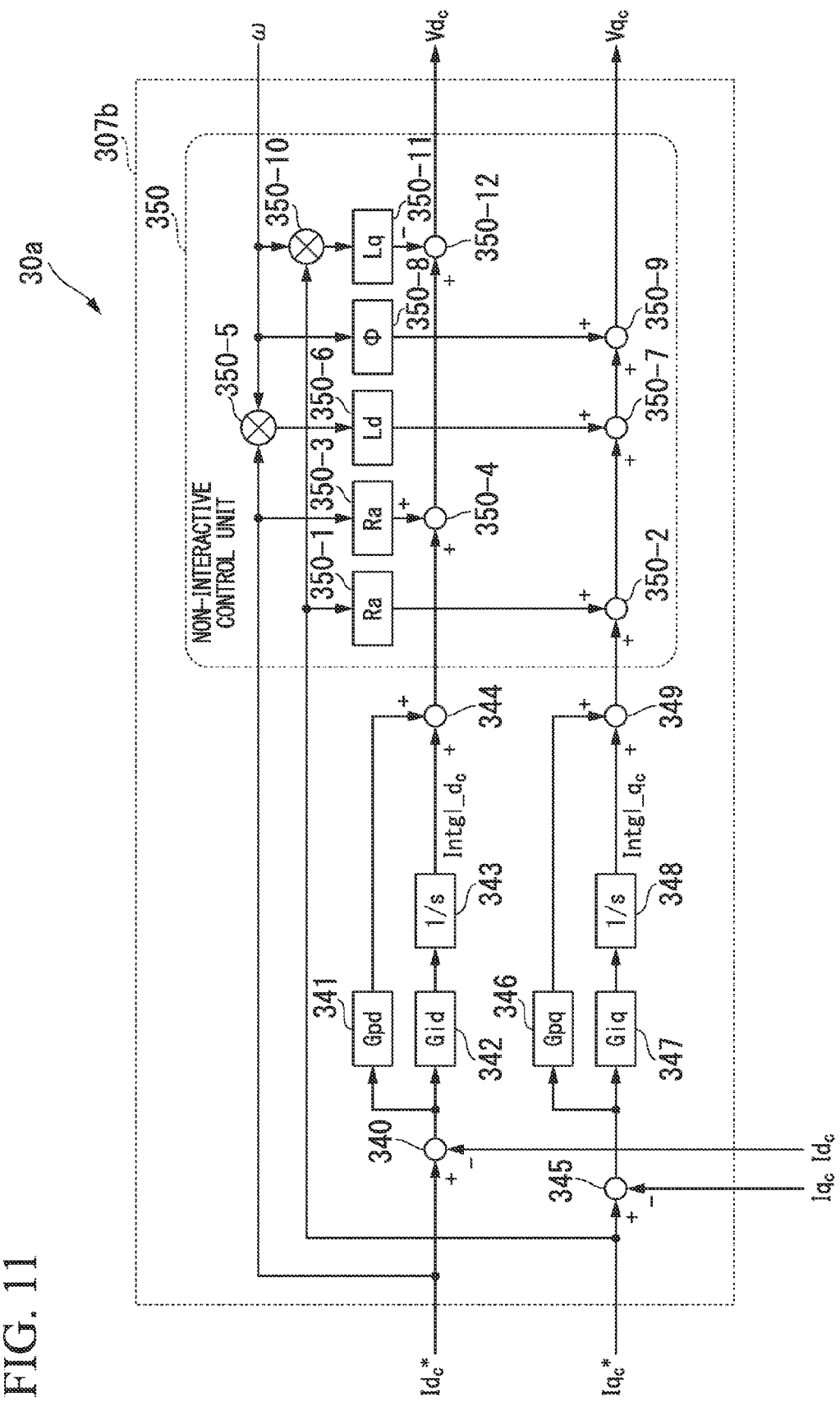
FIG. 11 is a block diagram illustrating a current PI control unit according to a second embodiment.

Units easily affected by noise or a high-frequency component in a current PI control unit 307b illustrated in FIG. 11 are an amplification unit Gpd341, an amplification unit Gid342, an amplification unit Gpq346, and an amplification unit Giq347. However, the noise or the high-frequency component is attenuated since outputs of the amplification unit Gid342 and the amplification unit Giq347 are integrated into integrators 343 and 348. Also, values inside a non-interactive control unit 350 are scarcely affected by the noise or the high-frequency component. Also, since integration is effective in a steady state, inputs of the amplification unit Gpd341 and the amplification unit Gpq346 are merely noise, and the outputs thereof do not affect voltage vectors. Therefore, in the present embodiment, the outputs of the amplification unit Gpd341 and the amplification unit Gpq346 easily affected by the noise or the high-frequency component are excluded among internal data of the current PI control unit 307b and values rarely affected by the noise or the high-frequency component are used to generate a d-axis voltage command value Vd' and a q-axis voltage command value Vq'. Further, in the present embodiment, an offset correction device measures the d-axis voltage command value Vd' and the q-axis voltage command value Vq' generated in this way and calculates an offset error using the measured d-axis voltage command value Vd' and q-axis voltage command value Vq'.

FIG. 11 is a block diagram illustrating the current PI control unit 307b according to the present embodiment.

The $d_c$-axis current command value $Id_c^*$ and the $q_c$-axis current command value $Iq_c^*$ output by the current command unit 304a (FIG. 4), the $d_c$-axis current $Id_c$ and the $q_c$-axis current $Iq_c$ output by the first phase conversion unit 600 (FIG. 4), and the angular velocity ω output by the velocity calculation unit 302 (FIG. 4) are input to the current PI control unit 307b of the motor control device according to the present embodiment. The current PI control unit 307b generates a $d_c$-axis voltage command value $Vd_c$ and a $q_c$-axis voltage command value $Vq_c$ based on these input values and outputs the generated $d_c$-axis voltage command value $Vd_c$ and $q_c$-axis voltage command value $Vq_c$ to the second phase conversion unit 601 (FIG. 4).

As illustrated in FIG. 11, the current PI control unit 307b includes addition units 340, 344, 345, and 349, the amplification unit Gpd341, the amplification unit Gid342, the integrators 343 and 348, the amplification unit Gpq346, the amplification unit Giq347, and the non-interactive control unit 350.

Also, the non-interactive control unit 350 includes Ra parameter units 350-1 and 350-3, an Ld parameter unit 350-6, a φ parameter unit 350-8, an Lq parameter unit 350-11, addition units 350-2, 350-4, 350-7, 350-9, and 350-12, and multiplication units 350-5 and 350-10.

The addition unit 340 calculates a deflection $\Delta Id_c$ by subtracting the $d_c$-axis current $Id_c$ output by the first phase conversion unit 600 from the $d_c$-axis current command value $Id_c^*$ output by the current command unit 304a. The addition unit 340 outputs the calculated deflection $\Delta Id_c$ to the amplification units Gpd341 and Gid342.

The amplification unit Gpd341 stores a d-axis current control proportional gain. Also, the d-axis current control proportional gain is calculated and stored in advance by a designer of the motor control device 30. The amplification unit Gpd 341 multiplies the deflection $\Delta Id_c$ output by the addition unit 340 by the d-axis current control proportional gain and outputs the multiplied value Gpd×$\Delta Id_c$ to the addition unit 344.

The amplification unit Gid342 stores a d-axis current control integral gain. Also, the d-axis current control integral gain is calculated and stored in advance by the designer of the motor control device 30. The amplification unit Gid 342 multiplies the deflection $\Delta Id_c$ output by the addition unit 340 by the d-axis current control integral gain and outputs the multiplied value Gid×$\Delta Id_c$ to the integrator 343.

The integrator 343 integrates the value Gid×$\Delta Id_c$ output by the amplification unit Gid342 and outputs an integrated value Intgl_$d_c$ (=Gid×Σ($\Delta Id_c$)) to the addition unit 344.

The addition unit 344 adds the value Intgl_$d_c$ output by the integrator 343 and the value Gpd×($\Delta Id_c$) output by the amplification unit Gpd341 and outputs an added value Intgl_$d_c$+Gpd×($\Delta Id_c$) to the non-interactive control unit 350.

The addition unit 345 calculates a deflection $\Delta Iq_c$ by subtracting the $q_c$-axis current $Iq_c$ output by the first phase conversion unit 600 from the $q_c$-axis current command value $Iq_c^*$ output by the current command unit 304a. The addition unit 345 outputs the calculated deflection $\Delta Iq_c$ to the amplification units Gpq346 and Giq347.

The amplification unit Gpq346 stores a q-axis current control proportional gain. Also, the q-axis current control proportional gain is calculated and stored in advance by the designer of the motor control device 30. The amplification unit Gpq 346 multiplies the deflection $\Delta Iq_c$ output by the addition unit 345 by the q-axis current control proportional gain and outputs the multiplied value Gpq×($\Delta Iq_c$) to the addition unit 349.

The amplification unit Giq347 stores a q-axis current control integral gain. Also, the q-axis current control integral gain is calculated and stored in advance by the designer of the motor control device 30. The amplification unit Giq 347 multiplies the deflection $\Delta Iq_c$ output by the addition unit 345 by the d-axis current control integral gain and outputs the multiplied value Giq×($\Delta Iq_c$) to the integrator 348.

The integrator 348 integrates the value Giq×($\Delta Iq_c$) output by the amplification unit Giq347 and outputs an integrated value Intgl_$q_c$ (=Giq×Σ($\Delta Iq_c$)) to the addition unit 349.

The addition unit 349 adds the value Intgl_$q_c$ output by the integrator 348 and the value Gpq×($\Delta Iq_c$) output by the amplification unit Gpd346 and outputs an added value Intgl_$q_c$+Gpq×($\Delta Iq_c$) to the non-interactive control unit 350.

Next, each unit of the non-interactive control unit 350 will be described.

The Ra parameter unit 350-1 stores a resistance value of the wiring resistor Ra which is a predetermined value in advance. Also, the resistance value of the wiring resistor Ra is calculated and stored in advance by the designer of the motor control device 30. The Ra parameter unit 350-1 multiplies the $q_c$-axis current command value $Iq_c^*$ output by the current command unit 304a by the resistance value of the wiring resistor Ra and outputs a multiplied value Ra×$Iq_c^*$ to the addition unit 350-2.

The addition unit 350-2 adds the value Ra×$Iq_c^*$ output by the Ra parameter unit 350-1 and the value (Intgl_$q_c$+Gpq×($\Delta Id_c$)) output by the addition unit 349 and outputs an added value Intgl_$q_c$+Gpq×($\Delta Iq_c$)+Ra×$Iq_c^*$ to the addition unit 350-7.

The Ra parameter unit 350-3 stores a resistance value of the wiring resistor Ra which is a predetermined value in advance. The Ra parameter unit 350-3 multiplies the $d_c$-axis current command value $Id_c^*$ output by the current command unit 304a by the resistance value of the wiring resistor Ra and outputs a multiplied value Ra×Id$_c$* to the addition unit 350-4.

The addition unit 350-4 adds the value Ra×Id$_c$* output by the Ra parameter unit 350-3 and the value (Intgl_d$_c$+Gpd×(ΔId$_c$)) output by the addition unit 344 and outputs an added value Intgl_d$_c$+Gpd×(ΔId$_c$)+Ra×Id$_c$* to the addition unit 350-12.

The addition unit 350-5 multiples the d$_c$-axis current command value Id$_c$* output by the current command unit 304a by the angular velocity ω output by the velocity calculation unit 302 and outputs a multiplied value ωId$_c$* to the Ld parameter unit 350-6.

The Ld parameter unit 350-6 stores a d-axis inductance Ld which is a predetermined value in advance. Also, the d-axis inductance Ld is calculated and stored in advance by the designer of the motor control device 30. The Ld parameter unit 350-6 multiplies the value ωId$_c$* output by the multiplication unit 350-5 by the d-axis inductance Ld and outputs a multiplied value ωLd×Id$_c$* to the addition unit 350-7.

The addition unit 350-7 adds the value ωLd×Id$_c$* output by the Ld parameter unit 350-6 and the value Intgl_q$_c$+Gpq×(ΔIq$_c$)+Ra×Iq$_c$* output by the addition unit 350-2 and outputs an added value Intgl_q$_c$+Gpq×(ΔIq$_c$)+Ra×Iq$_c$*+ωLd×Id$_c$* to the addition unit 350-9.

The φ parameter unit 350-8 stores the interlinkage magnetic flux Φa of the rotor of the motor 10 which is a predetermined value in advance. Also, the interlinkage magnetic flux Φa is calculated and stored in advance by the designer of the motor control device 30. The φ parameter unit 350-8 multiplies the angular velocity ω output by the velocity calculation unit 302 by the interlinkage magnetic flux Φa and outputs a multiplied value ωΦa to the addition unit 350-9.

The addition unit 350-9 adds the value ωΦa output by the φ parameter unit 350-8 and the value Intgl_q$_c$+Gpq×(ΔIq$_c$)+Ra×Iq$_c$*+ωLd×Id$_c$* output by the addition unit 350-7 and outputs an added value Intgl_q$_c$+Gpq×(ΔIq$_c$)+Ra×Iq$_c$*+ωLd×Id$_c$*+ωΦa as the q$_c$-axis voltage command value Vq$_c$.

The addition unit 350-10 multiplies the angular velocity ω output by the velocity calculation unit 302 by the q$_c$-axis current command value Iq$_c$* output by the current command unit 304a and outputs a multiplied value ωIq$_c$* to the Lq parameter unit 350-11.

The Lq parameter unit 350-11 stores a q-axis inductance Lq which is a predetermined value in advance. Also, the q-axis inductance Lq is calculated and stored in advance by the designer of the motor control device 30. The Lq parameter unit 350-11 multiplies the value ωIq$_c$* output by the multiplication unit 350-10 by the q-axis inductance Lq and outputs a multiplied value ωLq×Iq$_c$ to the addition unit 350-12.

The addition unit 350-12 subtracts the value ωIq$_c$*×Lq output by the Lq parameter unit 350-11 from the value Intgl_d$_c$+Gpd×(ΔId$_c$)+Ra×Id$_c$* output by the addition unit 350-4 and outputs a subtracted value Intgl_d$_c$+Gpd×(ΔId$_c$)+Ra×Id$_c$*−ωLq×Iq$_c$* as the d$_c$-axis voltage command value Vd$_c$.

The voltage measurement unit 402a acquires a d$_c$-axis voltage command value Vd$_c$' expressed in the following equation (16) and a qc-axis voltage command value Vqc' expressed in the following equation (17) excluding Gpd×(ΔId$_c$) and Gpq×(ΔIq$_c$), which are proportional control values, from the d$_c$-axis voltage command value Vd$_c$ and the q$_c$-axis voltage command value Vq$_c$ calculated in this way by the current PI control unit 307b, and then calculates the offset error correction value Δθ' using the acquired d$_c$-axis voltage command value Vd$_c$ and q$_c$-axis voltage command value Vq$_c$ by the following equation (18). Also, in each of equations (16) and (17), the first term is an integral value and terms after the second term are feed-forward components by the non-interactive control unit 350.

$$Vd'_c = \text{Intgl\_d}_c + Ra \times Id^*_c - \omega Lq \times Iq^*_c \qquad (16)$$

$$Vqc' = \text{Intgl\_q}_c + Ra \times Iq^*_c - \omega Ld \times Id^*_c + \omega \Phi a \qquad (17)$$

[Math. 11]

$$\Delta\theta' = \tan^{-1}\left(\frac{Vd'_c}{Vd'_q}\right) \qquad (18)$$
$$= \tan^{-1}\left(\frac{\text{Intgl\_d}_c + R_a \times Id^*_c - \omega Lq \times Iq^*_c}{\text{Intgl\_d}_q + R_a \times Id^*_q + \omega Ld \times Id^*_c + \omega \Phi_a}\right)$$

Also, in the present embodiment, the offset error correction value may be calculated by measuring a d$_{c1}$-axis voltage command value Vd$_{c1}$', a q$_{c1}$-axis voltage command value Vq$_{c1}$', a d$_{c2}$-axis voltage command value Vd$_{c2}$' and a q$_{c2}$-axis voltage command value Vq$_{c2}$' at the time of the positive rotation and the negative rotation of the motor 10 by velocity command values with the same absolute value and substituting the measured values into equation (12).

In the present embodiment, as described above, the voltage measurement unit 402a acquires the d-axis voltage command value Vd' and the q-axis voltage command value Vq' by the integral values, which are internal data of the current PI control unit 307b, and the feed-forward components of the non-interactive control unit 350 instead of the d-axis voltage command value Vd and the q-axis voltage command value Vq. The integral values and the feed-forward components of the non-interactive control unit 350 are less affected by the noise or the high-frequency component included in the d-axis voltage command and the q-axis voltage command. As a result, by calculating the offset error correction value using the d-axis voltage command value Vd' and the q-axis voltage command value Vq' acquired in this way, it is possible to suppress the influence of the noise and the high-frequency component. Further, by controlling the motor 10 using the offset error correction value calculated in this way, it is possible to perform the motor control with high precision.

Also, when the offset error is large, a control system in the motor control device becomes unstable. Thus, when the offset error is great, an assembly failure, a wiring fault, or the like of the resolver may occur. For this reason, in the first and second embodiments, it may be detected whether the offset error is greater than a predetermined value (for example, 90 degrees) by a known technology, and the motor and the resolver may be detected for removal in advance.

Also, in the present embodiment, the example in which the offset error is calculated by rotating the motor 10 in the unloaded state at the constant velocity and the motor control is performed by adding the calculated offset error correction value and the detection signal by the resolver has been described, but the present invention is not limited thereto. By rotating the motor 10 in a state of reverse constant load torque positively and negatively rather than the unloaded state, the motor control system 1 can cancel the internal phase difference angle δ described with reference to FIG. 5.

Also, to realize the functions of the units in FIGS. 1, 4, and 11 of the embodiment, the functions may be executed by a program stored also in a ROM, an HDD, or the like connected to a CPU of a computer system. Alternatively, the functions may be realized by hardware using a programmable logic device (PLD), an application specific integrated circuit (ASIC), or a circuit.

Since the present invention is applicable broadly to a motor control device and a motor control method, a voltage command value is measured when a motor is rotated at a constant velocity, a correction value is calculated at a rotation position of the motor based on the measured current command value, and the rotation of the motor is controlled using the calculated correction value. Thus, even when the detected rotation position is deviated, the motor can be controlled with high precision.

DESCRIPTION OF THE REFERENCE SYMBOLS

1 Motor control device
10 Motor
20 Resolver
30, 30a Motor control device
40, 40a Offset correction device
60 Control target
70 Addition unit
302 Velocity calculation unit
303 Velocity PI control unit
304 Current command unit
305 Current detector
306 3-phase/2-phase conversion unit
307, 307a Current PI control unit
308 2-phase/3-phase conversion unit
309 Duty calculation unit
310 Power conversion unit
401 Control unit
402 Voltage measurement unit
403 Offset calculation unit
600 First phase conversion unit
601 Second phase conversion unit
602 Motor voltage equation unit
603 Torque equation unit
604 (1/Js)
605 (1/s)

The invention claimed is:

1. A motor control device generating a voltage command value from a current command value and performing feedback control using a detection current flowing in a motor, the motor control device comprising:
a velocity control unit configured to perform velocity control of the motor;
a voltage measurement unit configured to measure the voltage command value based on an output of the velocity control unit when the motor is rotated at a constant velocity; and
a correction value calculation unit configured to calculate a correction value at a rotation position of the motor based on the measured voltage command value,
wherein the voltage command value includes a d-axis voltage command value and a q-axis voltage command value,
the voltage measurement unit measures the d-axis voltage command value and the q-axis voltage command value when the motor is rotated based on the velocity command value,
the correction value calculation unit calculates a first correction value based on phases of the measured d-axis voltage command value and the measured q-axis voltage command value when the motor is positively rotated,
the correction value calculation unit calculates a second correction value based on phases of the measured d-axis voltage command value and the measured q-axis voltage command value when the motor is negatively rotated,
the velocity control unit performs the velocity control such that an absolute value of a rotation velocity of the motor in the positive rotation of the motor is the same as an absolute value of rotation velocity of the motor in the negative rotation of the motor, and
the correction value calculation unit calculates the correction value by calculating an average of the calculated first and second correction values.

2. The motor control device according to claim 1, wherein the correction value calculation unit generates a value indicating the rotation position by adding the calculated correction value and a detection value corresponding to the rotation position of the motor, and
the velocity control unit controls the motor based on the generated value indicating the rotation position.

3. The motor control device according to claim 1, wherein the correction value calculation unit calculates the correction value, the first correction value, and the second correction value using an equation below:

$$\text{CORRECTION VALUE} = \tan^{-1}\left(\frac{d\text{-XIS VOLTAGE COMMAND VALUE}}{q\text{-AXIS VOLTAGE COMMAND VALUE}}\right). \quad [\text{Math. 1}]$$

4. The motor control device according to claim 1,
wherein the velocity control unit includes
a current proportional integral control unit configured to include a non-interactive control unit generating the voltage command value from the current command value, and
the voltage measurement unit measures a d-axis voltage command value Vd' generated based on an integral component of a d-axis current deflection generated in the current proportional integral control unit and a d-axis voltage component generated in the non-interactive control unit and a q-axis voltage command value Vq' generated based on an integral component of a q-axis current deflection generated in the current proportional integral control unit and a q-axis voltage component generated in the non-interactive control unit.

5. The motor control device according to claim 4,
wherein the voltage measurement unit measures the d-axis voltage command value Vd' expressed in an equation below:

$Vd'$=(INTEGRAL VALUE OF $d$-AXIS CURRENT DEFLECTION)+(WIRING RESISTANCE VALUE $Ra$)×($d$-AXIS CURRENT COMMAND VALUE)−(ANGULAR VELOCITY ω OF MOTOR)×(INDUCTANCE COMPONENT VALUE OF $q$ AXIS)×(CURRENT COMMAND VALUE OF $q$ AXIS) [Math. 2]

and measures the q-axis voltage command value Vq' expressed in an equation below:

$Vq'$=(INTEGRAL VALUE OF $q$-AXIS CURRENT DEFLECTION)+(WIRING RESISTANCE VALUE $Ra$)×($q$-AXIS CURRENT COMMAND VALUE)+(ANGULAR VELOCITY ω OF MOTOR)×(INDUCTANCE COMPONENT VALUE OF $d$ AXIS)×(CURRENT COMMAND VALUE OF $d$ AXIS)+(ANGULAR VELOCITY ω OF MOTOR)×(LINKAGE MAGNETIC FLUX Φa OF MOTOR) [Math 3].

6. A motor control method of a motor control device generating a voltage command value from a current command value and performing feedback control using a detection current flowing in a motor, the motor control method comprising:

a velocity control procedure of performing, by a velocity control unit, velocity control of the motor;

a voltage measurement procedure of measuring, by a voltage measurement unit, the voltage command value based on an output of the velocity control unit when the motor is rotated at a constant velocity; and a correction value calculation procedure of calculating, by a correction value calculation unit, a correction value at a rotation position of the motor based on the measured voltage command value, wherein the voltage command value includes a d-axis voltage command value and a q-axis voltage command value, the voltage measurement procedure measures the d-axis voltage command value and the q-axis voltage command value when the motor is rotated based on the velocity command value, the correction value calculation procedure calculates a first correction value based on phases of the measured d-axis voltage command value and the measured q-axis voltage command value when the motor is positively rotated, the correction value calculation procedure calculates, a second correction value based on phases of the measured d-axis voltage command value and the measured q-axis voltage command value when the motor is negatively rotated, the velocity control procedure performs the velocity control such that an absolute value of a rotation velocity of the motor in the positive rotation of the motor is the same as an absolute value of rotation velocity of the motor in the negative rotation of the motor, and the correction value calculation procedure calculates the correction value by calculating an average of the calculated first and second correction values.

* * * * *